(12) United States Patent
Nguyen et al.

(10) Patent No.: US 11,299,981 B2
(45) Date of Patent: Apr. 12, 2022

(54) CONTINUOUS TRAJECTORY CALCULATION FOR DIRECTIONAL DRILLING

(71) Applicant: HRL Laboratories, LLC, Malibu, CA (US)

(72) Inventors: Hung Nguyen, Los Angeles, CA (US); Logan D. Sorenson, Thousand Oaks, CA (US); David L. Walter, Malibu, CA (US); Adour V. Kabakian, Malibu, CA (US); Raviv Perahia, Agoura Hills, CA (US); Shuoqin Wang, Oak Park, CA (US); David W. Shahan, Malibu, CA (US); Lian X. Huang, Malibu, CA (US); David T. Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 449 days.

(21) Appl. No.: 16/208,449

(22) Filed: Dec. 3, 2018

(65) Prior Publication Data
US 2019/0169979 A1    Jun. 6, 2019

Related U.S. Application Data

(60) Provisional application No. 62/594,073, filed on Dec. 4, 2017.

(51) Int. Cl.
*E21B 47/09* (2012.01)
*E21B 41/00* (2006.01)
(Continued)

(52) U.S. Cl.
CPC .............. *E21B 47/09* (2013.01); *E21B 41/00* (2013.01); *E21B 47/022* (2013.01);
(Continued)

(58) Field of Classification Search
CPC ........ E21B 47/09; E21B 41/00; E21B 47/022; E21B 47/024; E21B 47/04; E21B 47/017;
(Continued)

(56) References Cited

U.S. PATENT DOCUMENTS

| 5,386,977 A | * | 2/1995 | Quast | ...................... F16F 13/26 267/140.13 |
|---|---|---|---|---|
| 6,895,678 B2 | | 5/2005 | Ash | |

(Continued)

FOREIGN PATENT DOCUMENTS

| EP | 2980350 A2 | 2/2016 |
|---|---|---|
| WO | 2018/102264 A1 | 6/2018 |
| WO | 2018/156417 A1 | 8/2018 |

OTHER PUBLICATIONS

U.S. Appl. No. 62/669,333, filed May 9, 2018, Perahia.
(Continued)

*Primary Examiner* — Andrew Schechter
*Assistant Examiner* — Kaleria Knox
(74) *Attorney, Agent, or Firm* — Ladas & Parry

(57) ABSTRACT

An instrument package for use during the drilling a wellbore. The instrument package includes a plurality of instruments such as accelerometers, gyroscopes, and magnetometers; a computer is configured to determine the current position of the plurality of instruments from a set of measurements produced by the plurality of instruments; and wherein the plurality of instruments are mechanically isolated from a drill head assembly by one or more multi-degree of freedom vibration isolators. The computer preferably has at least two modes different analytical modes of analyzing the set of measurements produced by the plurality of instruments, including a continuous mode and a survey mode, the continuous mode being operational during times that active drilling is occurring and the survey mode being (Continued)

operational during times that the active drilling is not occurring.

33 Claims, 22 Drawing Sheets

(51) Int. Cl.
  *G01P 15/105* (2006.01)
  *G01P 15/14* (2013.01)
  *G01C 1/00* (2006.01)
  *G01C 19/00* (2013.01)
  *E21B 47/024* (2006.01)
  *E21B 47/022* (2012.01)
  *G01P 15/18* (2013.01)

(52) U.S. Cl.
  CPC .............. *E21B 47/024* (2013.01); *G01C 1/00* (2013.01); *G01C 19/00* (2013.01); *G01P 15/105* (2013.01); *G01P 15/14* (2013.01); *G01P 15/18* (2013.01)

(58) Field of Classification Search
  CPC . E21B 44/00; E21B 7/10; E21B 47/00; G01C 1/00; G01C 19/00; G01P 15/105; G01P 15/14; G01P 15/18; F16F 13/26
  See application file for complete search history.

(56) References Cited

U.S. PATENT DOCUMENTS

| | | | |
|---|---|---|---|
| 10,246,988 | B2 | 4/2019 | Wang |
| 2006/0006000 | A1 | 1/2006 | Weston |
| 2010/0108384 | A1* | 5/2010 | Byreddy ................ E21B 44/00 175/27 |
| 2010/0307742 | A1* | 12/2010 | Phillips .................. E21B 47/04 166/250.01 |
| 2014/0102793 | A1* | 4/2014 | Hall ......................... E21B 7/10 175/40 |
| 2016/0281489 | A1 | 9/2016 | Dykstra |
| 2017/0175517 | A1* | 6/2017 | Ledroz .................... E21B 7/10 |
| 2017/0226845 | A1* | 8/2017 | Kuroiwa ............... E21B 47/017 |
| 2017/0292840 | A1 | 10/2017 | Sorenson |
| 2017/0335676 | A1* | 11/2017 | Dykstra ................ E21B 47/09 |
| 2018/0080310 | A1 | 3/2018 | Sorenson |
| 2018/0128101 | A1* | 5/2018 | Ledroz .................... E21B 47/00 |
| 2018/0149480 | A1 | 5/2018 | Wang |
| 2018/0238930 | A1 | 8/2018 | Nguyen |
| 2018/0252550 | A1 | 9/2018 | Kabakian |
| 2018/0274355 | A1 | 9/2018 | Kona |
| 2018/0371892 | A1 | 12/2018 | Shahan |
| 2018/0372180 | A1 | 12/2018 | Shahan |
| 2019/0049246 | A1 | 2/2019 | Sorenson |
| 2019/0049247 | A1 | 2/2019 | Huang |
| 2019/0072388 | A1 | 3/2019 | Huang |

OTHER PUBLICATIONS

U.S. Appl. No. 16/004,854, filed Jun. 11, 2018, Shahan.
U.S. Appl. No. 16/153,601, filed Oct. 5, 2018, Perahia.
U.S. Appl. No. 16/389,462, filed Apr. 19, 2019, Huang.
PCT International Search Report and Written Opinion from PCT/US2018/063701 dated Mar. 20, 2019.
PCT International Preliminary Report on Patentability (Chapter II) from PCT/US2018/063701 dated Jan. 6, 2020.
Extended Search Report from European Patent Application No. 18887102.4 dated Aug. 19, 2021.

* cited by examiner

CONTINUOUS TRAJECTORY CALCULATION FOR DIRECTIONAL DRILLING

CROSS REFERENCE TO RELATED APPLICATIONS

This application claims the benefit of US Provisional Patent Application Ser. No. 62/594,073 Filed Dec. 4, 2017 and entitled: "Continuous Guidance and Navigation System Designed for Directional Drilling", the disclosure of which is hereby incorporated herein by reference.

This application is also related to the following applications:

i. U.S. Provisional Application Ser. No. 62/233,936 filed Sep. 28, 2015 and entitled: "Real Time Trajectory Estimation With Multi-Station Analysis" and its related Non-Provisional application Ser. No. 15/279,390 filed Sep. 28, 2016 each of which is hereby incorporated herein by reference;

ii. U.S. Provisional Patent Application Ser. No. 62/427,561 filed Nov. 29, 2016 and entitled "Incremental Trajectory Estimation Based on Real Time Inertial Sensing" and its related Non-Provisional application Ser. No. 15/825,067 filed Nov. 28, 2017, each of which is hereby incorporated herein by reference;

iii. U.S. Provisional Application Ser. No. 62/461,715 filed Feb. 21, 2017 and entitled "MEMS-Based Inertial Measurement Unit (IMU) Sensor Suite for Downhole Navigation" and its related Non-Provisional application Ser. No. 15/897,819 filed Feb. 15, 2018 and entitled " MEMS-Based Sensor Suite", each of which is incorporated herein by reference;

iv. U.S. Provisional Patent Application Ser. No. 62/451,019 Filed Jan. 26, 2017 and entitled "Opportunistic Sensor Fusion Algorithm For Autonomous Guidance While Drilling" and its related Non-Provisional application Ser. No. 15/823,489 filed Nov. 27, 2017; application Ser. No. 15/823,489 is a Continuation in Part of U.S. application Ser. No. 15/387,435, filed in the United States on Dec. 21, 2016, entitled,"Gyromagnetic Geopositioning System," which is a Non-Provisional patent application of U.S. Provisional Application No. 62/321,042, filed on Apr. 11, 2016 and entitled: "Stabilization of Coriolis Vibratory Gyroscopes by Frequency Locking to Ultra Stable Clocks", each of the aforementioned applications is incorporated herein by reference;

v. U.S. Provisional Application Ser. No. 62/477,327 filed Mar. 27, 2017 and entitled: "Adaptive Downhole Inertial Measurement Unit Calibration Method and Apparatus for Autonomous Wellbore Drilling" and its related Non-Provisional application Ser. No. 15/897,907 filed Feb. 15, 2018, each of which is hereby incorporated herein by reference;

vi. U.S. Provisional Application Ser. No. 62/477,344 filed 3/271/2017 and entitled "System for determination of Measured Depth (MD) in wellbores from downhole pressure sensors using time of arrival techniques" and its related Non-Provisional application Ser. No. 15/881,700 filed Jan. 26, 2018, each of which is hereby incorporated herein by reference;

vii. U.S. Provisional Application Serial No. 62/524,867 filed Jun. 26, 2017 and entitled "Multi Degree of Freedom Vibration Isolator" and its related Non-Provisional application Ser. No. 16/004,854 filed Jun. 11, 2018, each of which is hereby incorporated herein by reference;

viii. U.S. Provisional Application Ser. No. 62/524,941 filed Jun. 26, 2017 and entitled "Combined fluid and elastomer vibration isolator" and its related Non-Provisional application Ser. No. 15/957,202 filed Apr. 19, 2018, each of which is hereby incorporated herein by reference;

ix. U.S. Provisional Application Ser. No. 62/525,031 filed Jun. 26, 2017 and entitled "Combined thermal regulation and mechanical isolation" and its related Non-Provisional application Ser. No. 16/017,669 filed Jun. 25, 2018, each of which is hereby incorporated herein by reference;

x. U.S. Provisional Patent Application Ser. No. 62/542,744 filed Aug. 8, 2017 and entitled "High Quality Factor MEMS Silicon Flower-of-Life Vibratory Gyroscope (FVG)" and its related Non-Provisional application Ser. No. 16/003,010 filed Jun. 7, 2018, each of which is hereby incorporated herein by reference;

xi. U.S. Provisional Patent Application Ser. No. 62/544,661 filed Aug. 11, 2017 and entitled "Multi-mode Coriolis Vibratory Gyroscopes having High Order Rotationally Symmetric Mechanical Structure and 32 Electrodes" and its related Non-Provisional application Ser. No. 16/004,310 filed Jun. 8, 2018, each of which is hereby incorporated herein by reference;

xii. U.S. Provisional Patent Application Ser. No. 62/555,617 filed Sep. 7, 2017 and entitled "High Quality Factor MEMS Silicon Hinge and Slot-cut Vibratory Gyroscope (HSVG)" and its related Non-Provisional application Ser. No. 16/102,565 filed Aug. 13, 2018, each of which is incorporated herein by reference;

xiii. U.S. Provisional Patent Application Ser. No. 62/596,463 filed Dec. 8, 2017 and entitled "MEMS Auxetic Interposer", the disclosure of which is hereby incorporated herein by reference;

xiv. U.S. Provisional Patent Application Ser. No. 62/669,326 filed May 9, 2018 and entitled "Disk Resonator Gyroscope (DRG) with Engineered Radial Stiffness for High Anchor Quality Factor (Q)", the disclosure of which is hereby incorporated herein by reference; and xv. U.S. Provisional Patent Application Ser. No. 62/669,333 filed May 9, 2018 and entitled "Disk Resonator Gyroscope (DRG) with Out-of-Plane Electrodes (OPEs)", the disclosure of which is hereby incorporated herein by reference.

STATEMENT REGARDING FEDERALLY SPONSORED RESEARCH OR DEVELOPMENT

None.

TECHNICAL FIELD

The present invention generally relates to well drilling and in particular to continuous well bore trajectory calculation during active well drilling operations.

BACKGROUND & DESCRIPTION OF RELATED ART

I. Current Technology Leads to Drilling Based on Incomplete and Possibly Also Inaccurate Data The gas and oil industry typically directs borehole drilling equipment at great subterranean distances. Borehole drilling is often performed by top side drillers without any navigation sensors operating because the noisy environment at the down hole Bore Hole Assembly (BHA) and the low data rate for communications to the surface. When the drillers need to know the current position of the BHA they pause the drilling operation and use a variety of downhole sensors to estimate the position and trajectory of the drilling equipment. Such a pause occurs naturally from time to time when an addition length of pipe is added to the drill string used to turn the BHA and/or apply weight thereto. These pauses are known as survey time and the drilling rig is then said to be in a "survey mode". Magnetometer-based trajectory estimation is often employed to estimate the borehole trajectory based on magnetometer readings. The magnetometers are used to detect the azimuth of the drilling tools near the drill. By pairing the magnetometers with gyroscopes, the drillers are able to learn about both the inclination and azimuth of the subterranean drill, thereby allowing for trajectory estimation. The data from the magnetometers and gyroscopes is often sent to an offsite office for evaluation to determine the trajectory estimation which is then sent back to the drillers onsite, and since time is of the essence in drilling operations, the drillers may commence drilling soon after the additional length of pipe is added to the drill string and before they have received the trajectory estimation from the offsite office.

One problem, however, is that the aforementioned measurement is performed while all of the sensors are stationary and the drilling has stopped, i.e., in the survey mode. The topside drillers must operate dead reckoning between surveys and frequently also when they are awaiting a new trajectory estimation from the offsite office. Moreover surveys are not precise. The accuracy of the drill bit location degrades as the bit travels down the borehole because of uncertainty in the path length of the borehole and errors in the measurements of Earth's magnetic field and rotation rate.

It would be desirable to adapt the navigation techniques that have been used on autonomous vehicles, self-maneuvering airplanes, and indoor robot movement, etc., to provide a real-time position and trajectory estimation available during active drilling operations as well as during survey periods. In the aforementioned navigation techniques, accelerometers, gyros and magnetometers, provide continuous measurements, are used for real-time trajectory estimation, attitude determination, and navigation.

A problem in adapting these vehicular navigation techniques into the downhole drilling environment is that these techniques are extremely sensitive to bias drift in the gyroscopes. The downhole environment is extremely "noisy" (i.e., vibrations, shocks, ambient temperature swings, etc.). As a result, the gyroscope's bias drift is very difficult to contain to an acceptable low limit. Any deterministic or random bias will lead to large position estimation runaway due to its proportionality to the cube of time.

Conceptually the bias of a gyroscope measurement can be determined by fixing the gyroscope in an inertial frame and monitoring the output. The average value of the output is the bias. By measuring the bias over time, say successive hour long intervals, the change in the bias per unit time is the bias drift.

Another problem in adapting these techniques into the downhole drilling environment is that currently the data rate for communicating in real time between the downhole sensors and topside drillers while drilling is very limited, on the order of 12 bits per second.

Thus, a continuing need exists for a fast and accurate trajectory estimation system that preferably operates in real-time (and also post-facto surveying) across various configurations, platforms and phases of the drilling operation.

Current directional drilling processes require many steps before an estimated trajectory can be determined, starting with connecting a new pipe stand (pipe stands often come in approximately 90 foot lengths, known as a 'triple' in the industry) which initiates sensor data (survey) acquisition. This lengthy process that includes human intervention at several intervals and multiple data conversion/correction can potentially add significant delay to the drilling. Due in part to these delays, drillers, under pressure to reduce non-productive time, will often proceed without waiting for clear analysis of the processed data or guidance from geosteerers. Under vague notion of where the wellbore could be based on previous data, drillers are forced to then correct course once the data has been corrected, received, and interpreted. While a driller's primary incentive is to drill as quickly as possible to reduce non-productive time, other factors must be considered, having profound consequences to the entire operation including wellbore quality (minimal tortuosity, dog leg severity), minimal failure rates, and maximum reservoir recovery. Drillers have control of the drillbit by adjusting several primary parameters: weight on bit (WOB), drill string rpm, drill motor rpm, drill face angle via the drill string rpm, and drilling fluid (often called drilling mud or just "mud") flow rate. However there is little consistency across the industry and even between teams and results can vary based on the specific personnel.

Autonomy in these processes would be ideal. But such autonomy requires the real time communication between the downhole sensors and the topside drillers (as noted above) who have control of the BHA since given present technology, only the topside drillers can control WOB and drill string RPM, for example. At present, communication between downhole sensors and topside drillers can only reliably occur during survey periods and the data rates are tortuously slow during such survey periods. A solution may be forthcoming. But in the meantime, there is a better way of estimating the drill string's trajectory than that currently used as described above.

Instead of just determining the drill bit's position (or more correctly the position of the nearby downhole sensors) at survey periods, a better solution, as is disclosed herein, is to augment the position information gathered during a survey and to augment that stand-still survey information with position information computed downhole during active drilling. The sensor data gathered downhole during active drilling may be less accurate (than stand-still survey data due to the noisy environment while drilling), but far more data can be collected during active drilling (since there may be several hours between survey times) than can be collected during surveys, so computing the drill bit position while drilling can be advantageously used to enable real time guidance or at least real time trajectory calculation while drilling.

As illustrated in FIG. 1A, related art sensor systems 100 utilized for navigation, such as Attitude and Heading Reference Systems (AHRS) and Inertial Navigation Systems (INS), typically include a linear stack of discrete, uniaxial sensors which form a portion of the BHA. The BHA is positioned at the end of a drill string near the drill bit which located at the very end of the drill string. The related art sensor system 100 illustrated in FIG. 1A includes a housing or a chassis 101 housing a linear stack of three uniaxial accelerometers 102 stacked on top of a linear stack of three uniaxial magnetometers 103. Stacking the sensors 102, 103 in a linear arrangement results in a relatively large volumetric package or envelope of the sensor system 100. For instance, related art measurement while drilling (MWD) survey tools utilized in the oil and gas industry are typically confined to a 1.875 inch outer diameter chassis 101 that fits inside a 3.5 inch drill collar, and the axial arrangement of the sensors 102, 103 and corresponding electronics housed in the chassis 101 may have a length extending over 2 feet along an axis of the chassis 101. Additionally, the relatively large volumetric size of the related art sensor system 100 may result in relatively high cost, weight, and power consumption, and may inhibit the sensor system 100 from being positioned in an optimal location.

Moreover, the related art sensor system 100 is also sensitive to external environmental stimuli, such as thermal and mechanical gradients across the sensor system 100, due to the relatively large volumetric size of the sensor system 100 and the spacing between the sensors 102, 103. For instance, different thermal or mechanical loads (e.g., stresses) on different portions of the sensor system 100 may alter the output of the sensor system 100 depending on the distribution of the thermal and mechanical loads across the sensor system 100. These spatially-dependent effects exhibited by the related art sensor system 100 may result in positional errors and uncertainties when the sensor system 100 is incorporated into a navigation system.

II. Magnetic Noise Limits the Accuracy of Traditional Measurement While Drilling (MWD) Operations and Prevents Further Reduction of the Ellipse of Uncertainty on the Trajectory of a Wellbore Traditional Measurement While Drilling (MWD) directional systems use sensor suite of magnetometers and accelerometers to acquire attitude (inclination, azimuth, toolface) of the Bottom Hole Assembly (BHA) for trajectory estimation. See, for example, the discussion of FIG. 1A above regarding prior art sensor suites. The standard Industry Steering Committee on Wellbore Survey Accuracy (ISCWSA) error models used to calculate wellbore trajectories and their accompanied ellipsoid of uncertainty (EOU) indicate that the dominant error resides along the azimuth and the source of this error does not originate from the magnetometers but the temporal and spatial magnetic interference that corrupt the sensor data. Error correction to separate the magnetic noise from true Earth field is standard practice and can collapse the EOU by 60%, but such corrections (i.e. Multi-station analysis) are only implemented once sensor data is transmitted to the surface and sent offsite to a remote third party facility. Incorporation of magnetic-immune gyroscopes into directional systems provide an independent source of azimuth information that can effectively compensate for magnetic errors. These gyroscopes are generally of a dynamically tuned (DTG) type that employs a spinning mass to detect angular rates, thus are highly susceptible to vibration and shock and prone to physical contact and damage, thus require power off cycles during drilling to avoid sensor failure due to the complexity of the mechanical components. Thus, these gyros cannot be used during the majority of the drilling process but only during survey periods. So while these prior art techniques might be referred to as Measurement While Drilling (MWD), the prior measurements are made when the drill string is not turning and the drill motor is off, so the term "MWD" is a bit misleading. Prior art MWD measurements are made during the formation of a wellbore, but not when actively drilling that wellbore.

III. Limited Spatial Trajectory Resolution

Current directional drilling practices used to generate wellbore positions and trajectories are limited by conventional MWD technology in terms of the resolution and continuity of downhole data. As a consequence, wellbore trajectories often have a spatial resolution of 90 ft. (the approximate length of standpipe 'triple') dictated by surveys taken during stand-still standpipe connections. Without additional information between surveys, the wellbore path is interpolated between survey points through an idealized minimum curvature method which can mask real-world imperfections such as tortuosity and dog-leg severity, both of which are side-effects of imperfect drilling operations. Ignorance of actual wellpath trajectory can affect and even mislead key decisions on drilling, geosteering (directing and controlling the drillbit based on geological information).

IV. Poor Downhole Data Fidelity and Sampling Rate

The oil and gas industry currently lacks a solid understanding of downhole environment such as the relationship between drill string dynamics (vibration, shock, whirl, stick-slip) and rock formation characteristics (porosity, hardness, lithology), and how these two datasets can inform better drilling practices or predict system failure during drilling. Valuable information from the downhole dynamics may have frequency content that is well beyond current sensor bandwidth (400 Hz) thus cannot be fully captured by today's MWD tools. Existing MWD sensors acquire data at infrequent times, potentially leaving a dearth of downhole information that would otherwise enable better drilling practices.

V. Lack of Accurate Measurement of Bore Head Depth

Measured depth acquisition is essential to estimate wellbore trajectory based on length of pipe drilled between surveys. The aforementioned minimum curvature method to interpolate wellbore path between surveys assumes a fixed distance based on the measured standpipe length but does not account for pipe sag or stretch. Even without pipe sag or stretch, current pipe measurement approach carries significant errors given that pipe lengths can vary considerably—enough to effect the trajectory after 20,000 ft. of pipe have been drilled into the wellbore. While measured depth can be estimated through multiple approaches, they all rely on steps taken at the surface requiring additional infrastructure and logistics. Sensor drifts away for calibrated range during operation. Today's sensor error corrections are primarily done by a third party at an offsite facility. In addition to added costs and dependency on these third parties, the current convoluted process can take up more than twelve minutes between data acquisition at the surface, transmitting datasets to a remote facility, and receiving the corrected values to calculate BHA attitude, at which time drilling operations have already commenced without accurate knowledge of the survey position. Drillers then correct course once data has been received and interpreted, often leading to over-correction and increased micro dog-leg severity. Even though sensors are calibrated before arriving at the field, sensors are known to drift during operations. There is no current technique to monitor these drifts.

VI. The Presently Disclosed Technology can Provide Accurate Wellbore Trajectories that are Constructed in Real-Time Embodiments according to the principles of the present invention describe a self-contained, continuous downhole navigational system designed primarily for directional, horizontal or unconventional drilling where accurate wellbore trajectories can be constructed in real-time. Whereas conventional directional systems such as measurement-while-drilling (MWD) simply record and transmit magnetic and gravitational measurements at spatial intervals of 90 ft., the Continuous Trajectory Calculation for Directional Drilling (CTCDD) system according to the principles of the present invention surpass current MWD capabilities by fusing multiple sensor data streams, including magnetic and acceleration, to construct a continuous and more accurate wellbore trajectory and preferably also automatically takes appropriate actions based on environmental conditions (e.g. excessive vibration, rotation) or deviations of the wellbore trajectory from the well plan.

As is described in greater detail below, the fusion of data to obtain accurate wellbore trajectories that are constructed in real-time involves providing an instrument package (including at least three 3-axis sensors) having at least two modes of operation including a continuous mode and a survey mode, the continuous mode being operational at least during times that the drilling apparatus is actively drilling and the survey mode being operational at least during times that the drilling apparatus is not actively drilling. A signal processing device applies a first set of algorithms to data collected from the at least three sensors while in said continuous mode of operation, the collected data and/or the results of applying said first set of algorithms to the data detected when in said continuous mode of operation being stored as stored data by said signal processing device. The signal processing device applies a second set of algorithms, different than said first set of algorithms, to data from the at least three sensors while in said survey mode of operation to determine a calculated position and attitude of the downhole instrument package (i) from data collected from the at least three sensors while in said survey mode of operation as augmented (ii) by said stored data.

BRIEF DESCRIPTION OF THE INVENTION

In one aspect the present invention provides a downhole instrument package for use with a well drilling apparatus, the downhole instrument package comprising: at least three sensors including an accelerometer, a magnetometer, a gyroscope, wherein the accelerometer, the magnetometer, and the gyroscope are mounted in an elongate configuration along with a signal processing device, the elongate configuration being supported by shock absorbers between a drill string associated with said well drilling apparatus and a drill face of a drill bit; the instrument package preferably having at least two modes of operation including a continuous mode and a survey mode, the continuous mode being operational at least during times that the drilling apparatus is actively drilling and the survey mode being operational at least during times that the drilling apparatus is not actively drilling; the signal processing device applying a first set of algorithms to data collected from the at least three sensors while in said continuous mode of operation, the collected data and/or the results of applying said first set of algorithms to the data detected when in said continuous mode of operation being stored as stored data by said signal processing device, the signal processing device applying a second set of algorithms, preferably different than said first set of algorithms, to data from the at least three sensors while in said survey mode of operation preferably to determine a calculated position of the downhole instrument package (i) from data collected from the at least three sensors while in said survey mode of operation as augmented (ii) by said stored data.

In another aspect the present invention provides a bottom hole assembly (BHA) for drilling an oilfield wellbore comprising: a plurality of instruments further comprising accelerometers, gyroscopes, and magnetometers; a computer configured to determine the current position of the plurality of instruments from a set of measurements produced by the plurality of instruments; and wherein the plurality of instruments are mechanically isolated from a drill head assembly of said BHA by one or more multi-degree of freedom vibration isolators.

In yet another aspect the present invention provides a method of monitoring a well drilling operation while actively drilling said well, the method comprising comprising: collecting a set of measurements from a plurality of downhole, environmental sensors vibrationally isolated within a bottom hole assembly (BHA);processing the set of measurements into a real time evaluation a current location of the environmental sensors by comparing data collected while actively drilling said well with data collected when the well drilling operation is not actively drilling the well.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale. Additionally, the patent or application file contains at least one drawing executed in color. Copies of this patent or patent application publication with color drawing(s) will be provided by the Office upon request and payment of the necessary fee.

DETAILED DESCRIPTION

Figure 1A:
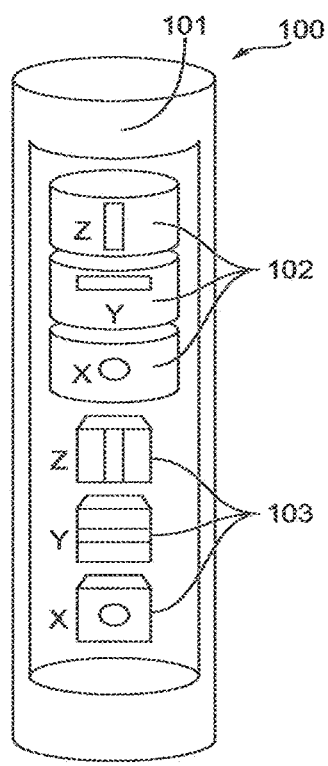
FIG. 1A shows a schematic side view of a related art sensor suite including a series of stacked accelerometers and a series of stacked magnetometers.

The structures and methods of the present invention will be described in detail by reference to various non-limiting embodiments, examples, and figures. The figures provide representative illustration of the invention and are not limiting in their content. The figures are not to be construed as limiting in any way, and are not drawn to scale. It will be understood by one of ordinary skill in the art that the scope of the invention extends beyond the specific embodiments depicted.

Unless otherwise indicated, all numbers expressing dimensions, capacities, conductivities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

As used in this specification and the appended claims, the singular forms "a," "an," and "the" include plural referents unless the context clearly indicates otherwise.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan. This invention also incorporates routine experimentation and optimization of the structures, systems, and methods described herein.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications identified in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

The Current State of the Art in Well Drilling

Current state of the art well drilling relies on "smart" surface operations and "dumb" Bore Hole Assembly (BHA) apparatus. The surface operators periodically (over rather long intervals of time) receive measured depth, measurements of the BHA azimuth, inclination, tool head angle, Earth's magnetic field, and Earth's gravity. From these measurements the surface operator computes the position and orientation of the BHA, compares the present position to the well plan, and calculates the commands to the BHA to alter the BHA trajectory to match the well plan.

The intervals between such data acquisitions is rather long, typically several hours, since each time the surface operator wants to update commands given to the BHA the operator has to stop drilling, activate the sensors, collect the data, and recompute the commands. This is typically done at times the operator needs to add an increment of pipe to the drill string. In between these intervals of data collection and calculation the sensors are powered down and the BHA resumes drilling until another length of pipe has to be added or the operator believes the BHA commands have to be updated. So the drilling is done mostly blind since the BHA has limited knowledge (basically assumed knowledge) of its actual position or direction. Although while rotating or sliding the BHA can transmit temperature, gamma strength and toolface angle to the surface, that does not provide sufficient data to be able to compute the present position of the BHA. Rotating means to rotate the pipe that makes up the drill string. The effect is to cause the drill head to rotate and if the drill motor is on, the drill head will travel in a spiral depending on the tool face angle. Sliding means the pipe of the drill string is not rotating. The effect is the drill head will travel in the direction set by the tool face angle if the drill motor is on causing the the drill string to follow a simple curve as opposed to follow a spiral. Moreover, the recomputation of the BHA position and orientation often requires the operators to send the collected data off site for processing and analysis, thereby introducing even more delay before drilling can be resumed to guide the BHA from its current position to its desired position according to the well drill plan.

Another complication of this drill-stop-calculate-command-drill sequence is the operator has to compute the length of the drill string by maintaining a tally of the number of pipes in the drill string. Alternatively the operator may send a timed pulse through the drilling mud to the BHA where the time of arrival is compared to the time of transmission at the BHA by having a clock at the BHA synchronized with the surface operations. The measured depth (MD) has to be transmitted to the surface for incorporation into the BHA commands. This introduces further delays and provide opportunities for errors in the computation of commands to be given to the BHA to get back on the well drill plan.

Figure 1B:
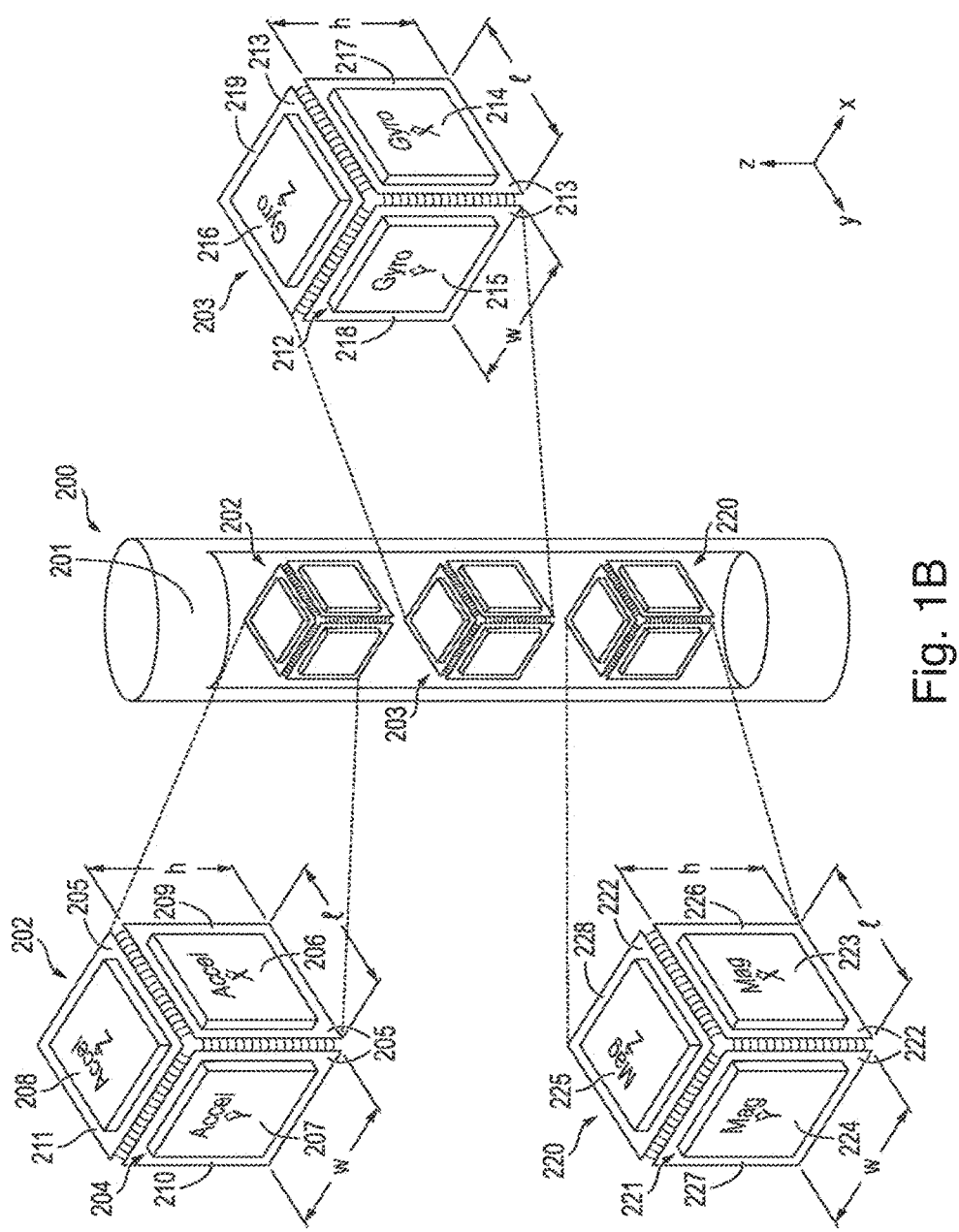
FIG. 1B is a schematic side view of a micro-electromechanical (MEMS)-based sensor suite according to an embodiment of the present disclosure.

Operational Concepts per Principles of Certain Embodiments of the Present Invention One key enabler to allowing continuous guidance while drilling is a sensor package or suite 200 shown in FIG. 1B small enough and light enough such that vibration isolators allow collection of sensor data while drilling. The prior art may provide sensor measurements but not while drilling. The weight of the sensor package precluded effective isolation of the vibrations from the drilling unit. The weight of the sensor package 200 and the chassis 201 is preferably less than 6.5 pounds Embodiments according to the principles of the present invention include small, lightweight sensor packages and vibration isolators effective at isolating the sensors from the vibrations present while drilling.

Figure 2:
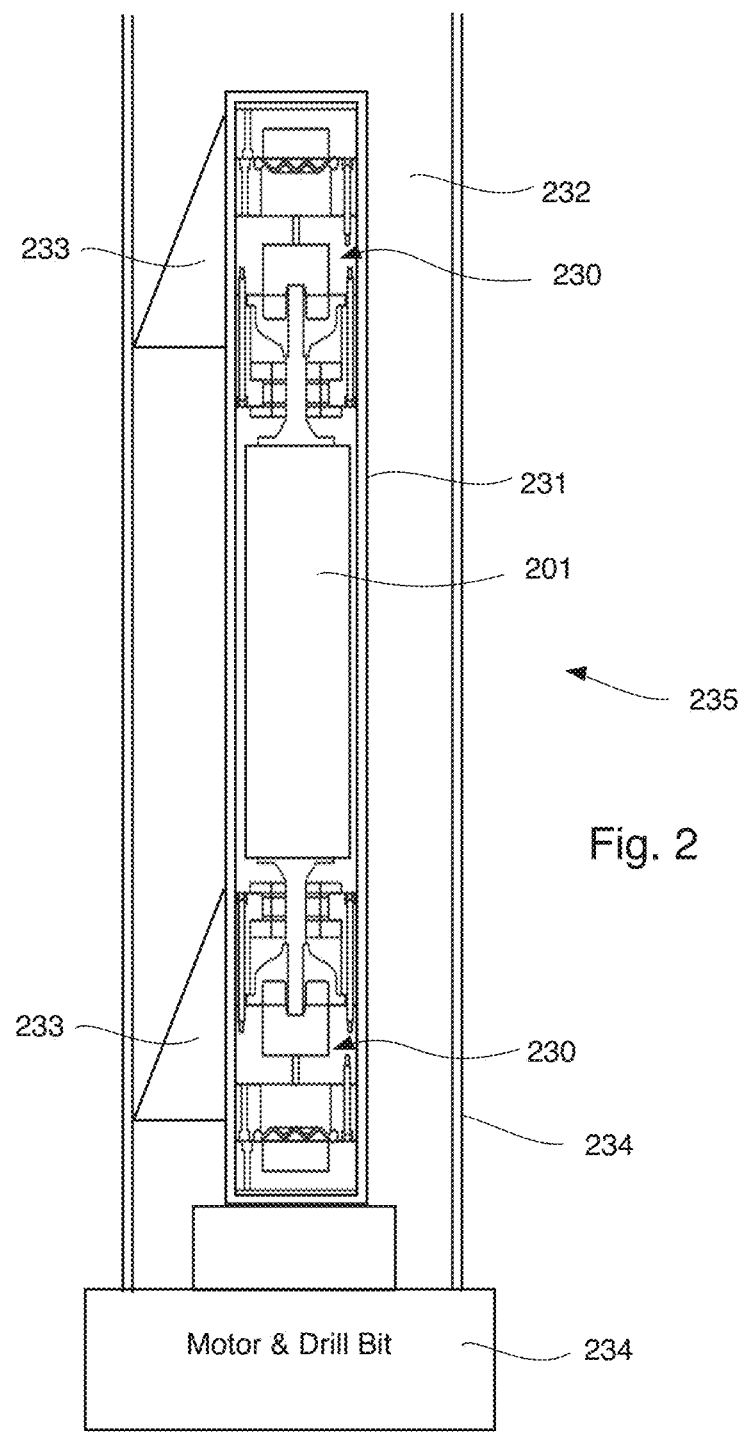
FIG. 2 is a schematic side view of the micro-electromechanical (MEMS)-based sensor suite package of FIG. 1B with vibration isolators attached and disposed in a portion of a BHA.

Turning now to FIG. 1B, according to one embodiment of the present disclosure, a MEMS-based inertial sensor suite 200, preferably comprising a three axis accelerometer 202, a three axis gyroscope 203, and a three axis magnetometer 220, is mounted within a housing or a chassis 201, preferably formed of Aluminum. The housing or a chassis 201 also may house other elements such as computational elements, but the housing or a chassis 201 importantly houses the three axis accelerometer 202, the three axis gyroscope 203, and the three axis magnetometer 220, which are vibrationally isolated from the BHA 235 by vibration isolators 230 (see FIG. 2). The housing or a chassis 201 along with its associated sensor suite 200 and the vibration isolators 230 and preferably various other elements (see FIG. 3)) are disposed within the pressure casing 231 which is preferably made of copper beryllium (CuBe). The pressure casing 231 is centrally located in the drill pipe 234 by centralizer fins 233. In the illustrated (FIG. 1B) embodiment of the sensor suite 200, the three axis accelerometer 202 includes an accelerometer sensor polyhedron (which is preferably embodied in a cubical shape) 204 or die having a series of faces 205 and three single axis accelerometers 206, 207, 208 on three faces 205 (e.g., three mutually orthogonal faces) of the accelerometer sensor polyhedron 204. The three axis gyroscope 203 of the MEMS-based sensor suite 200 preferably includes a gyroscope sensor polyhedron (again preferably embodied in a cubical shape) or die 212 having a series of faces 213 and three single axis MEMS gyroscopes 214, 215, 216 on three face 213 (e.g., three mutually orthogonal faces) of the gyroscope sensor polyhedron 212. The three axis magnetometer 220 of the MEMS-based sensor suite 200 includes a magnetometer sensor polyhedron (e.g., a cube) or die 221 having a series of faces 222 and three uniaxial magnetometers 223, 224, 225 on three faces 222 (e.g., three mutually orthogonal faces) of the magnetometer sensor polyhedron 221.

The three single axis MEMS gyroscopes 214, 215, 216 may be embodied as (i) Flower-of-Life Vibratory Gyroscopes (FVGs) as taught by U.S. Provisional Patent Application Ser. No. 62/542,744 filed Aug. 8, 2017 and entitled "High Quality Factor MEMS Silicon Flower-of-Life Vibratory Gyroscope (FVG)" and its related Non-Provisional application Ser. No. 16/003,010 filed Jun. 7, 2018, each of which is hereby incorporated herein by reference or may be embodied as (ii) Coriolis Vibratory Gyroscopes as taught by U.S. Provisional Patent Application Ser. No. 62/544,661 filed Aug. 11, 2017 and entitled "Multi-mode Coriolis Vibratory Gyroscopes having High Order Rotationally Symmetric Mechanical Structure and 32 Electrodes" and its related Non-Provisional application Ser. No. 16/004,310 filed Jun. 8, 2018, each of which is hereby incorporated herein by reference or may be embodied as (iii) Hinge and Slot-cut Vibratory Gyroscopes (HSVGs) as taught by U.S. Provisional Patent Application Ser. No. 62/555,617 filed Sep. 7, 2017 and entitled "High Quality Factor MEMS Silicon Hinge and Slot-cut Vibratory Gyroscope (HSVG)" and its related Non-Provisional application Ser. No. 16/102,565 filed Aug. 13, 2018, each of which is incorporated herein by reference. Other gyroscope designs may alternatively be utilized for gyroscopes 214, 215, 216 if desired.

Figure 3:
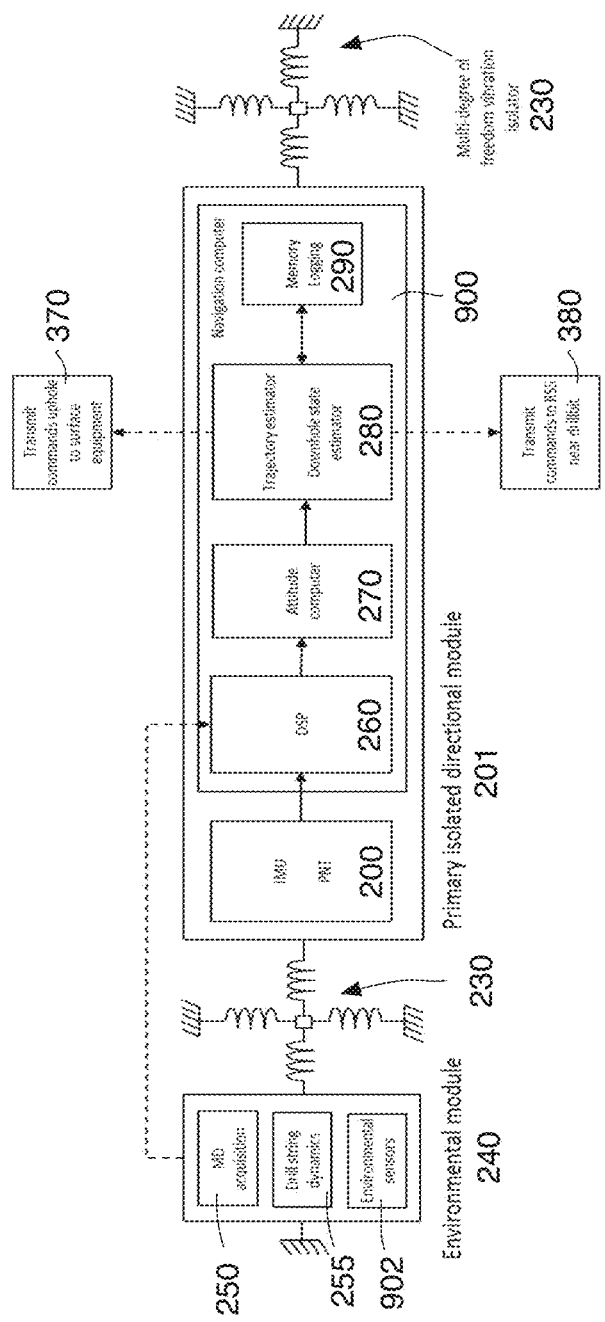
FIG. 3 shows a schematic of the major elements of an continuous self navigating well drilling apparatus (downhole tool).

FIG. 3 is a schematic diagram of possible sub-systems of the Continuous Directional Drilling Trajectory Calculation (CTCDD) apparatus relative to the multi-axis mechanical isolators 230. The CTCDD apparatus which may be embodied as a standalone downhole probe or sonde or may be incorporated in the BHA in some embodiments. Most or all of the elements comprising the CTCDD are encased in the Copper-Beryllium pressure casing 231 to withstand the extreme pressures (up to 20,000 PSI when installed in the casing 235) in the drilling environment. FIG. 3 schematically depicts the various internal modules of the CTCDD disposed within pressure casing 231. The mechanical isolators 230 (which may also offer thermal isolation) buffer sensitive components within its chassis 201 from, for example, 200 g peak shocks and vibration up to 18 grms along the transverse and axial directions and provide a thermal path for heat generated by the internal sensors and electronics to flow out to an external heat sink (mud flow). External to the isolators 230 lies the environmental module 240 which captures downhole dynamics and conditions at high sampling rates (>1 kSa/s). The data is streamed across the isolators 230 and into the navigation computer 900 where a digital signal processor (DSP) 260 conditions the data before storing the data into memory 290 where it can be downloaded upon retrieval at the surface or the data may be transmitted to the Rotary Steerable System at the surface by block 370. Between the isolators 230 are the high precision inertial sensor suite 200, signal processor 260, attitude computer 270 and trajectory estimator 280 which, among other functions, estimates the wellbore trajectory and the corresponding ellipse of uncertainty (EOU) based on sensor errors at the particular position along the trajectory. The components and sub-systems detailed in FIG. 3 are preferably made to be interchangeable and thus can be integrated with standard prior art components and modules that are commonly found in MWD systems such as batteries, centralizers, gamma analyzers and mud pulser modules.

Continuous Sensor Data Streams and Surveys of Opportunity

With the multi-axis vibration isolators 230 buffering the sensor suite 200 from high vibration and shock, the disclosed system is capable of continuous data acquisition beyond just survey points to include data acquisition during drilling. The continuous measurements from the inertial sensors 202, 203 and magnetometers 220 (at a 100 Hz bandwidth, for example) can be used to estimate continuous BHA attitude (inclination, azimuth, tool face) and position. Continuous attitude data can then be stored in memory 290 and optionally encoded and transmitted by a mud pulser to the surface to reconstruct a more accurate and continuous trajectory. Existing MWD installations have the sensors powered on only during survey periods which yields a sparse trajectory with one data point per 90 ft. However, the CTCDD can store and possibly also encode and transmit continuous Inclination, Azimuth, and toolface data from the sensors at 5 second period (typical rates) using conventional mud pulse telemetry. Assuming a typical Rate of Penetration (ROP) of 60 m/hr, the spatial resolution is then 0.3 ft., a 300× improvement in spatial resolution of the trajectory. Increase the ROP to 100 m/hr still achieves A trajectory resolution of 0.5 ft at the same transmission period of 5 sec. While the errors associated with continuous inclination/azimuth/toolface may be higher than during ideal survey periods where vibrations are at a minimal, the data can still provide valuable insight on the actual wellbore trajectory, filling in the voids traditional survey practices leave behind.

MWD directional tools typically monitor for a drop in mud flow to identify a start of a survey period where random vibrations are near zero. However, within the continuous sensor data acquired by the CTCDD, there can potentially be many instances of vibrationally quiet periods that are not officially a survey and are not recorded or detected by current systems despite having high value information. These unofficial quiet periods are ideal for what we call herein "surveys of opportunity" when accelerometers 202 pick up low enough vibrations that would not induce significant errors in the sensor data. After multiple datastreams are synchronized, the on-board Advance Data Processor ADP 900 (see FIG. 9) constantly scans accelerometer data stream for sustained levels below a specific pre-set threshold and time duration. The ADP 900 uses several techniques to monitor the accelerometer data for survey purposes. These include edge detection of the signal, signal variance, or correlation with bit depth. The ADP of FIG. 3 preferably follows this procedure and scan the time series until there is an obvious drop in accelerometer data. Overlay of bit depth over the accelerometer data helps to confirm that a survey is being taken or a general quiet period is observed.

Figure 4:
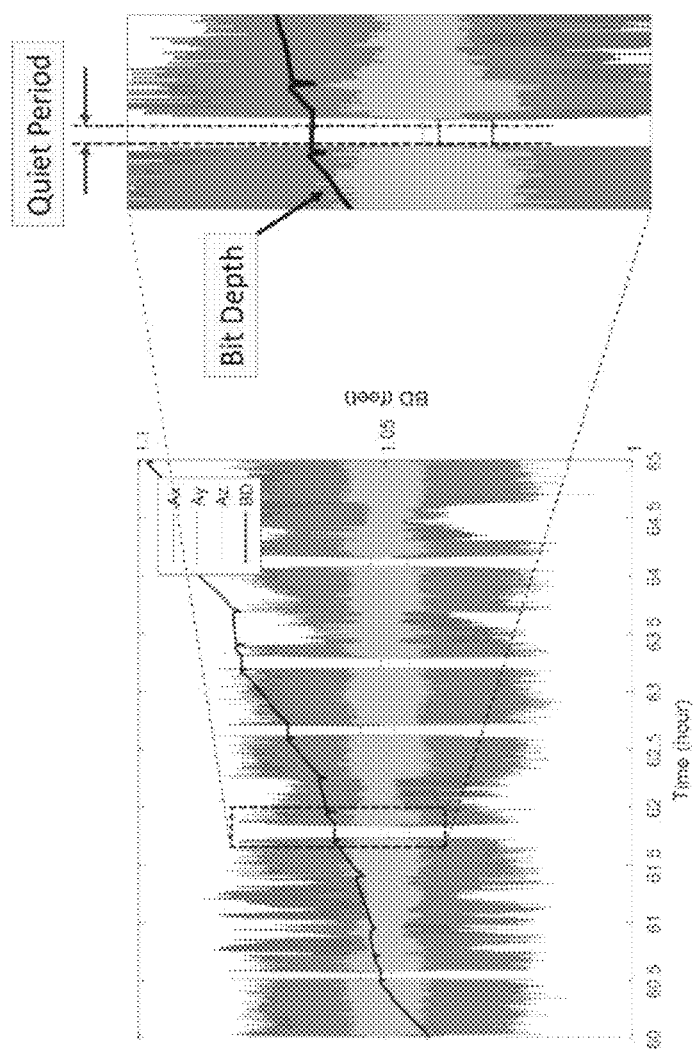
FIG. 4 depicts synchronized accelerometer data to detect credible quiet periods based on edge detection, sudden drop/jump in sensor data. Surveys are described as low noise.
Figure 5:
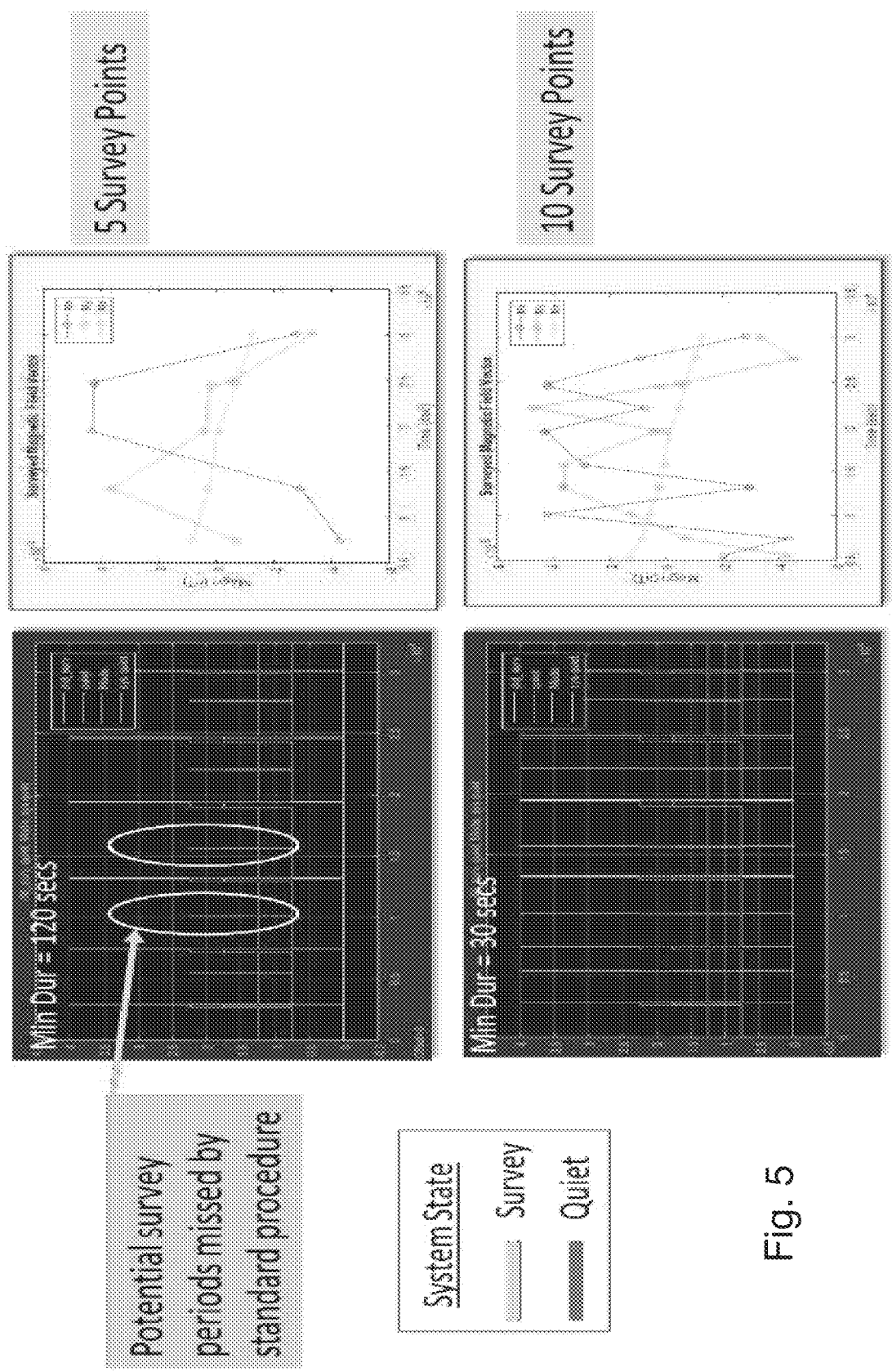
FIG. 5 has graphs showing the occurrences of periods of relative quiet while drilling which are either at least 120 seconds in length (upper plots) or at least 30 seconds in length (lower plots).

Typical survey times are approximately two minutes however, the sensors 202 and 203 do not necessarily require that much time to acquire data, often tens of seconds is sufficient. See FIG. 4 which shows exemplary instances of credible quite periods (below some arbitrarily-set threshold) occurring while drilling. These credible quite periods can occur during normal drilling operations when the drillbit is encountering softer material and the vibration (noise) caused by drilling is less intense. The upper data plots demonstrate that if a desired credible quiet period is at least 120 seconds long, then five opportunistic surveys may be taken, while during the same period of time, ten opportunistic surveys (see the lower plot) may be taken if the desired credible quiet period is only at least 30 seconds long. The desired credible quiet period is typically a preset time duration that can be arbitrarily set based on, for example, an Allan Deviation analysis of the individual sensors. As can be seen from FIG. 5 a longer set time will yield fewer quiet periods and less accurate trajectories. A quiet period detection routine found far fewer opportunistic surveys along the same trajectory with a 120 seconds duration even though the error factor associated is lower than during the contrasting 30 second opportunistic survey times (which occurred twice as many times) resulting in a more realistic non-linear trajectory even though each of the more frequent opportunistic surveys had a larger error factor. The general guideline is to select a minimal quite period duration without significant tradeoff in accuracy and position uncertainty. Additional opportunistic survey points will produce a more accurate wellbore trajectory with reduced uncertainty.

Figure 6A:
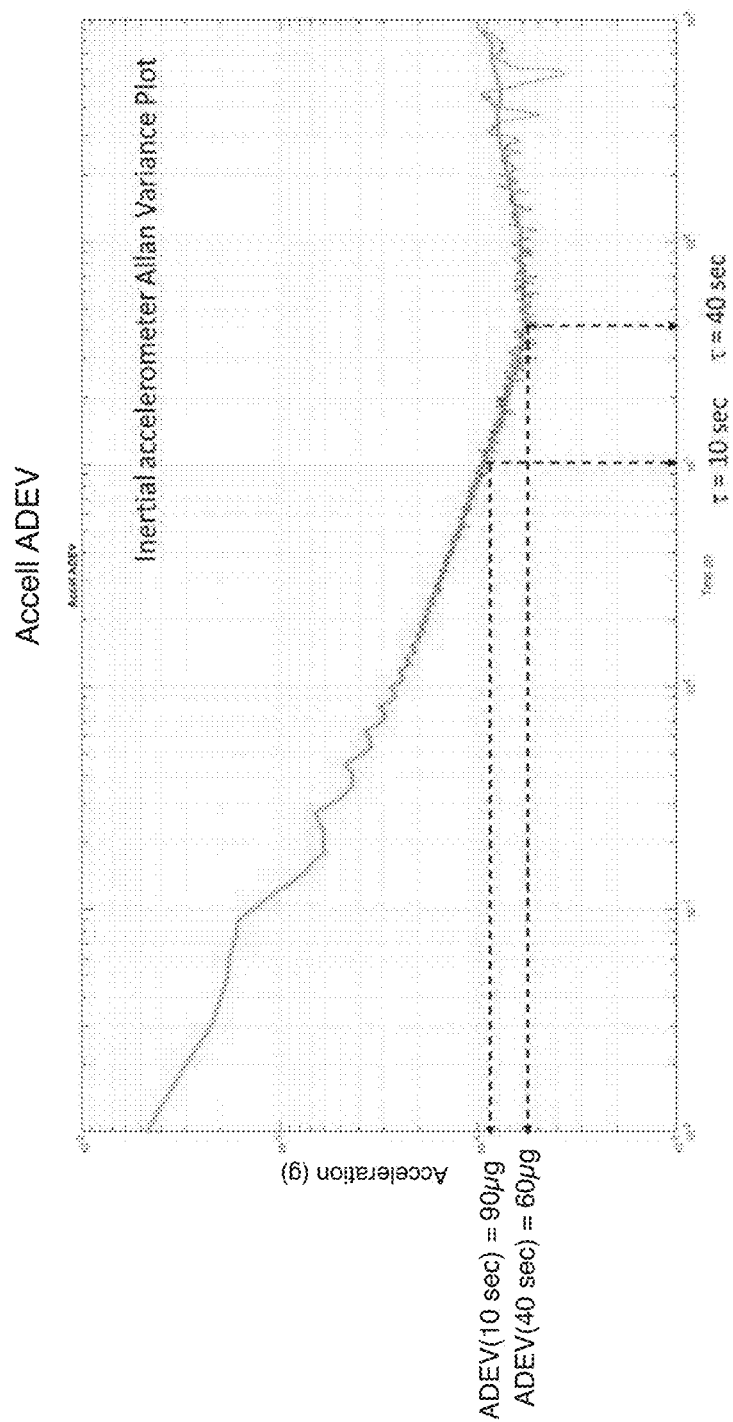
FIGS. 6a and 6b are Allan Deviation plots illustrating noise floor of individual sensors (inertial accelerometer and magnetometer, respectively) and the corresponding averaging time to reach the noise floor FIG. 7 are graphs of surveys of opportunities detected from the continuous sensor data by the advance data processor enables CTCDD to fill in the void between survey points yielding a more accurate trajectory.
Figure 6B:
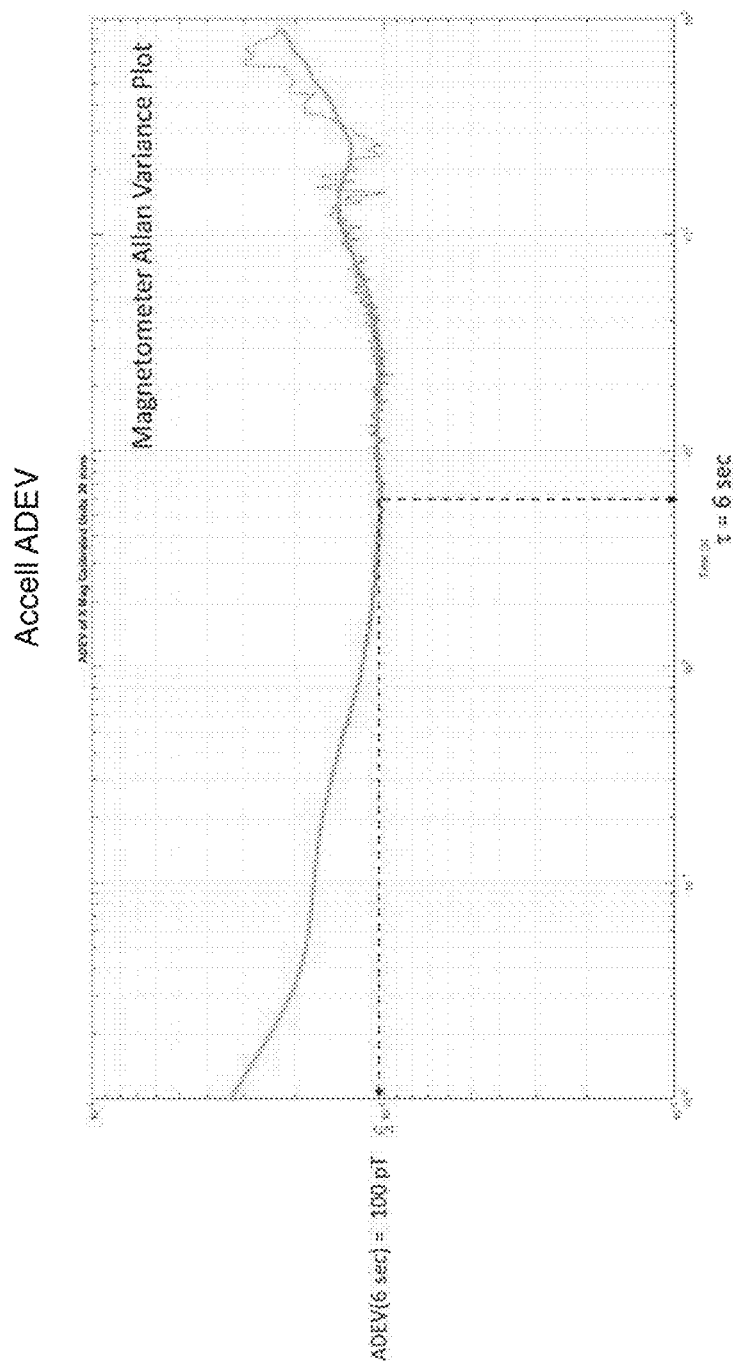

Duration (or time required to average or integrate the data to reach minimum noise) requirements depend on the noise profile of each inertial sensors and magnetometers. These profiles are obtained in the laboratory and the minimum time is uploaded to the ADP 900 prior to operation. FIG. 6a shows an Allan variance plot of the inertial accelerometer while FIG. 6b shows an Allan variance plot of the magnetometer. The Allan deviation value (y-axis) indicates the noise or instability of the accelerometer when the sensor data is averaged over a specific period $\tau$. Accelerometer noise floor (60 µg) can be reached by averaging for 40 seconds. The duration requirement and the associated standard deviation can be coded into the ADP 900 prior to a run. The magnetometer 220 reaches the noise floor more quickly at 6 seconds. Thus any survey of opportunities can be implemented with quiet duration of at least 10 seconds based on these plots.

Figure 7:
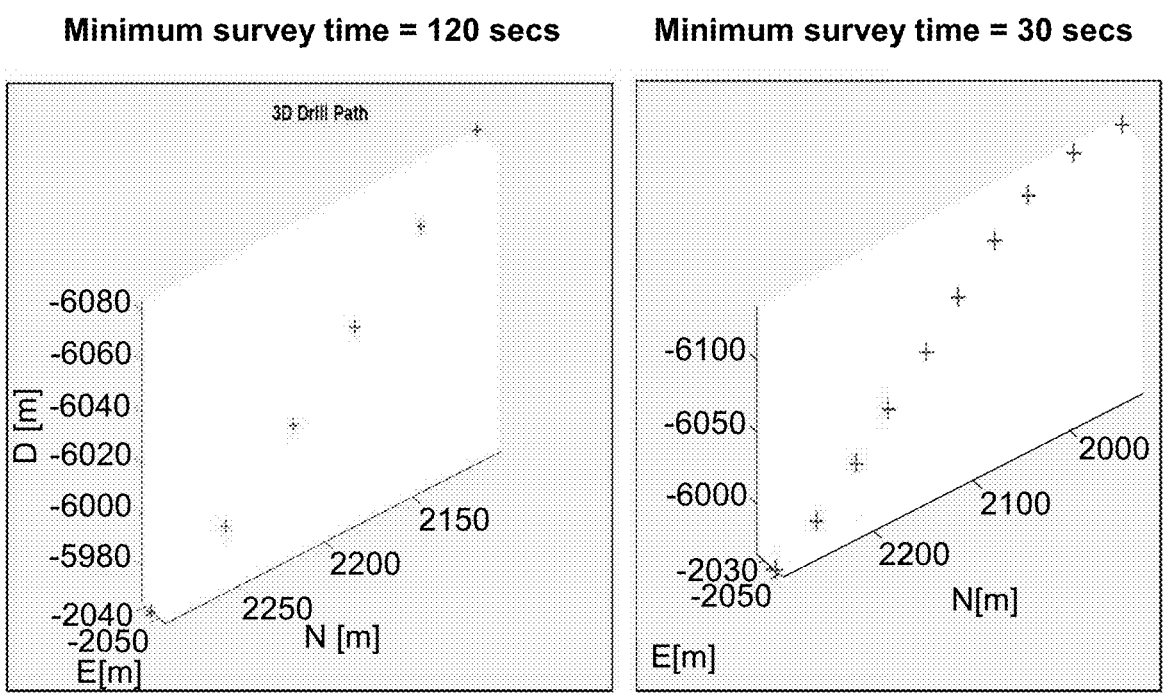

The plots of FIG. 7 show the effects on the shape of the trajectory when surveys of opportunity are added to the standard survey points along the trajectory. A thirty second minimum survey time yields twice the number of data points and a more realistic trajectory. While true survey data continues to be the most accurate given the lack of vibration, continuous attitude information during drilling and surveys of opportunity still carry high value despite a higher variance and uncertainty associated with the drilling conditions. From the same Allan variance plots described above, the downhole ADP can, in real-time, calculate the associated standard deviation of each sensor data and arrive at an uncertainty value for the calculated inclination, azimuth, and toolface angle during these surveys of opportunities.

High Speed Real-Time Environmental Data

One of the desirable features of the disclosed CTCDD system is the environmental recording module 240 which houses (preferably in pressure casing 231) multiple sensors 902 including temperature and mud pressure sensors 243, high-rate gyroscopes 242, and in particular the high frequency accelerometers 241. One differentiator between certain embodiments of the presently disclosed current CTCDD system from a standard MWD directional module is the ability to continuously record sensor data at high sampling rates to ensure full capture of high frequency downhole events. In one embodiment the CTCDD system will record the high sensitivity inertial navigation sensors (gyroscopes 203, magnetometers 225, accelerometers 202) at 100 Hz sampling rates and the high range and high-speed (>1 kHz) environmental sensors (gyroscopes 242 and accelerometers 241) operating continuously.

Figure 8:
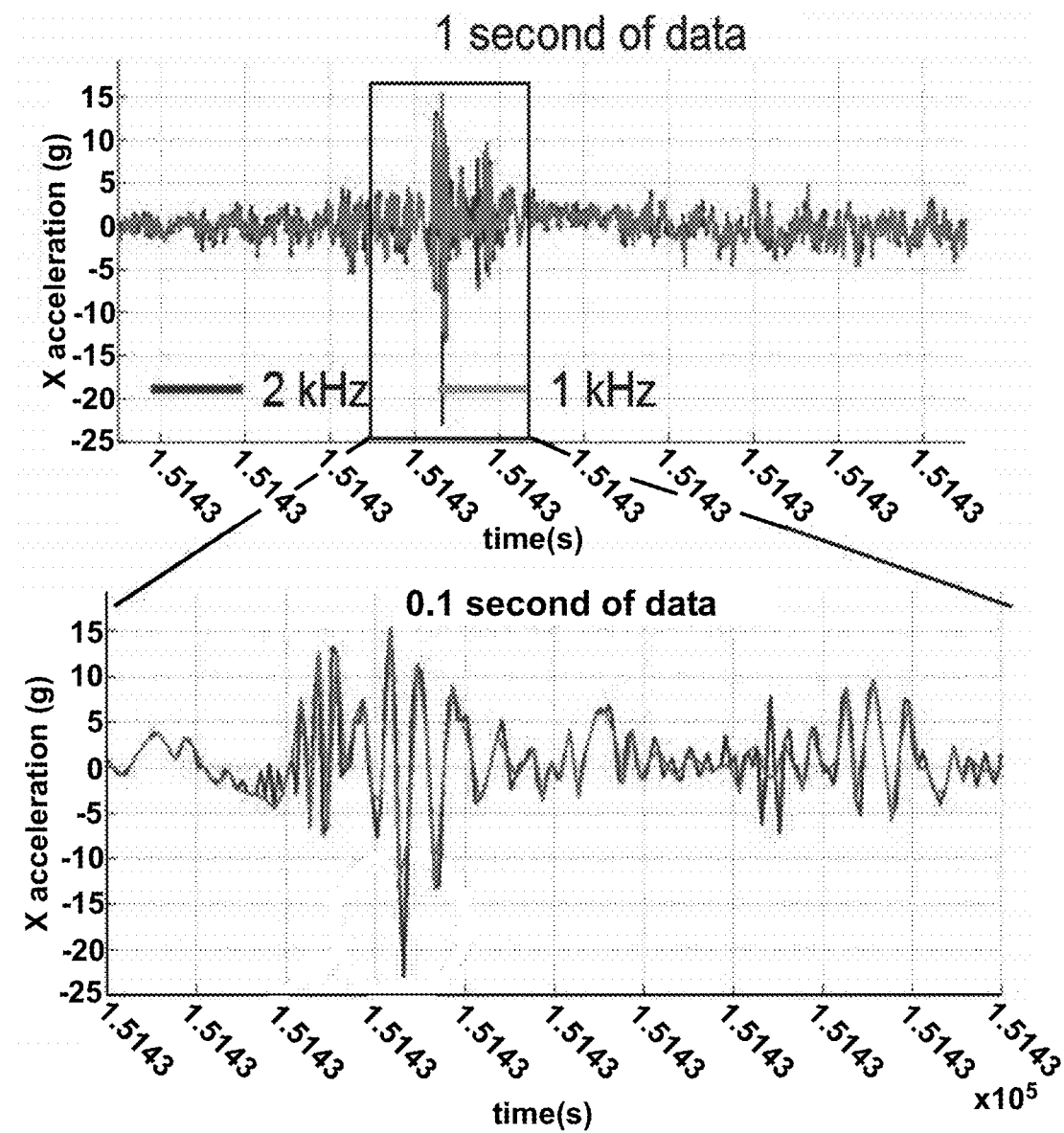
FIG. 8 depicts vibration data captured by the environmental module

The environmental module 240 preferably comprises less sensitive but higher range gyroscopes 242 and accelerometers 241 (compared to inertial gyroscopes 203 and accelerometers 202) that run at >1 kHz bandwidth to capture high frequency anomalies associated with the drill string dynamics, such as lateral and axial shocks, stick-slip, and whirl, as may be determined by an anomaly comparator 255 (if provided). Oil service providers do offer similar, yet limited tools at lower sampling rates or heavily filtered before data is recorded. At bandwidths greater than 1 kHz, the environmental sensors fully capture high frequency events that existing low bandwidth systems leave out or cut off mostly due to lower sampling rates. The vibration data captured by the environmental module illustrates this point in FIG. 8 where a 2 kHz sampling rate records high frequency events at their fullest amplitudes. These same events are either left off or cut off in amplitude when sampled at 1 kHz. Prior art systems provide data at only 400 Hz, severely limiting their value and providing a false sense of understanding of downhole events.

The high speed environmental data has two immediate uses related to better understanding of drill string dynamics and environmental conditions. Real time alerts can be transmitted to the surface when vibration data exceeds certain preset limits. These limits can foretell immediate tool failure during operation or degrades overall tool lifetime. A second application of the high fidelity, high speed data acquisition is post-drill analysis of the raw data as part of a larger database. To support such high bandwidths, the presently disclosed CTCDD preferably includes high speed microcontrollers, 24-bit analog-to-digital conversion, and sufficient memory to record all dataset with minimal filtering or compression.

Advance Data Processor

Figure 9:
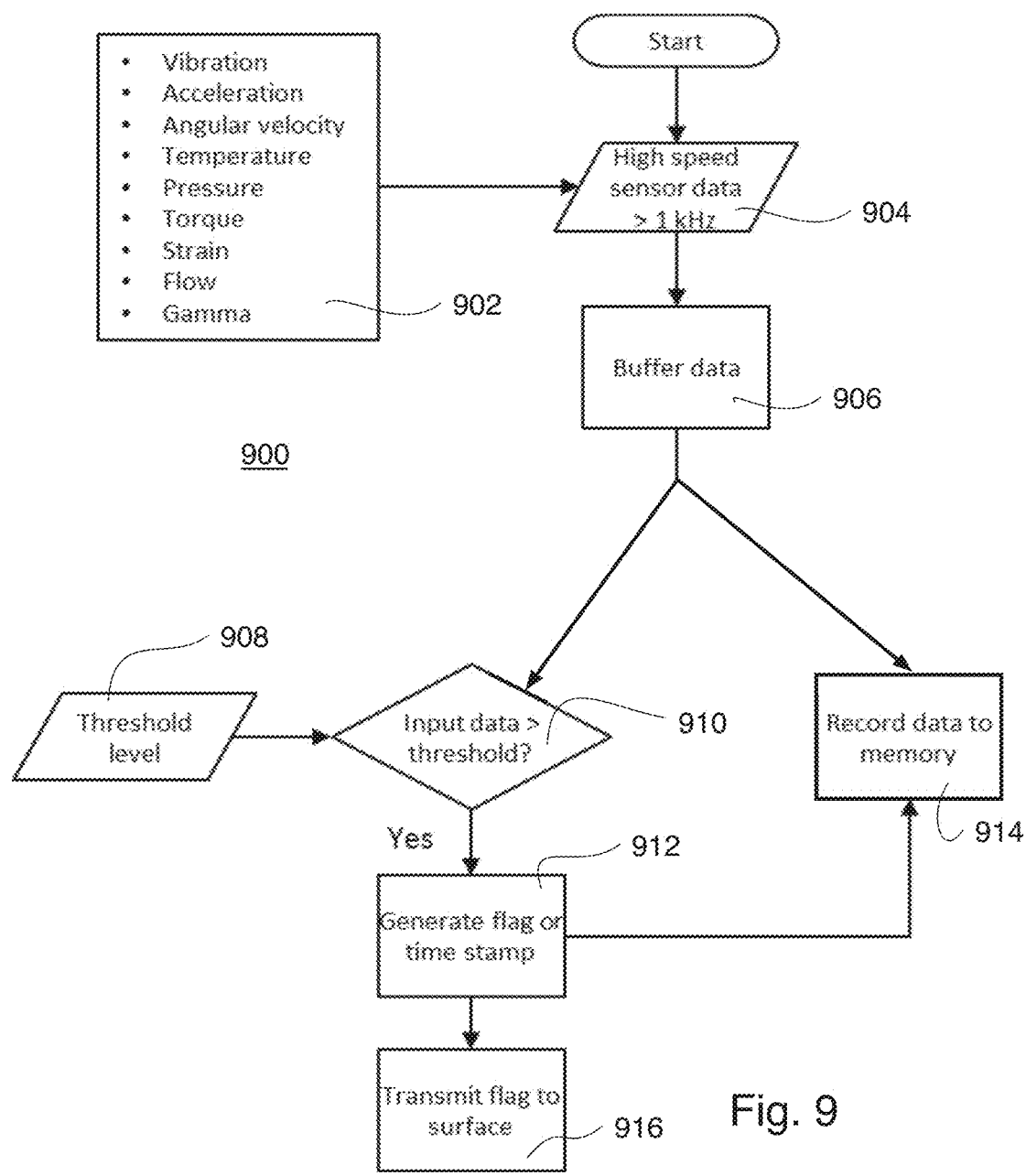
FIG. 9 illustrates one embodiment of an Advance Data Processor (ADP) which functions to detect potentially destructive events and relay warning message (flags) to personnel controlling a drilling rig.

FIG. 9 illustrates a flow chart for a computationally-light advance data processing, or ADP 900 that may leverage the high speed (>1 kHz) sensors 902 built into the external environmental module (see element 310 on FIG. 3) to capture drill string dynamics (in buffer 906) such as lateral and axial vibrations, stick slip, bit bounce, and whirl. From this data in buffer 906, the ADP 900 can run a frequency-domain analysis to determine any potential correlations between these dynamics and tool failure mechanisms or relationship to rock characteristics, thus providing greater insight on the formation and lithology. At its simplest configuration, the ADP 900 will apply threshold levels 908 and event detection (see element 910) to the sensor readings 904 from buffer 906 such that flags and time stamps may be generated (see element 912) and recorded in memory 914 when, for example, accelerometer data exceeds a pre-set range, indicating high vibration or shock levels that could shorten operational lifetime or is indicative of imminent tool failure. These flags can be sent up to the surface 916 as potential fault detection to inform drillers to throttle back on key parameters such as weight on bit or drill string rotation. Similarly, other environmental factors such high rotation speeds may be measured by high range gyroscopes or torque from strain sensors. Typical drill string rotation rates are below 100 rpm so any readings exceeding this level can be flagged and the time stamp recorded for post-drilling statistical analysis. Ultimately the ADP 900 will evolve into a fully autonomous navigation computer capable of predictive analytics for failure detection and drilling optimization. However, at this time ADP 900, if utilized, can simply monitor for high dynamic events based on threshold detection and transmits flags or warnings to the surface. From the same dataset the ADP 900 preferably also identifies quiet periods, whether or not those periods correspond to surveys or survey of opportunity, and send commands to transmit the calculated BHA attitude from the magnetic compassing algorithm to the surface for trajectory analysis between the 90 ft. surveys. FIG. 9 illustrates one embodiment of the ADP's function to detect potentially destructive events. Any sensor data can be used to monitor, record, and flag events to the surface.

Multi-Axis Mechanical Isolators

Mechanical isolators, and more preferably multi-axis mechanical isolators 230, are preferably utilized to prevent vibration impacting the sensor suite 200 (see FIG. 2) to maintain sensor stability during measurements and those measurements remain within calibration, especially during continuous operations when environmental vibration is high. The isolator(s) 230 allows the CTCDD to operate continuously even during high shock and vibrations. These isolators differentiates the CTCDD from existing directional systems where gyros are powered off except when surveying.

The reader's attention is directed to U.S. Provisional Application Ser. No. 62/524,867 filed Jun. 26, 2017 and entitled "Multi Degree of Freedom Vibration Isolator" and its related Non-Provisional application Ser. No. 16/004,854 filed Jun. 11, 2018, each of which is incorporated herein by reference, for a more detailed discussion of embodiments of multi-axis mechanical isolators. The reader's attention is also directed to (i) U.S. Provisional Application Ser. No. 62/524,941 filed Jun. 26, 2017 and entitled "Combined fluid and elastomer vibration isolator" and its related Non-Provisional application Ser. No. 15/957,202 filed Apr. 19, 2018, each of which is also incorporated herein by reference.

Embodiments of the present invention preferably use a combination of flexible structures and hydraulic damping in multiple axes to provide isolation in multiple degrees of freedom. These embodiments provide for mechanical isolation of applied shock and vibration between an input point or surface and an output point or surface. To better under-stand the such embodiments, please refer to FIGS. 10a and 10b herein along with U.S. Patent Application Ser. No. 16/004,854 filed Jun. 11, 2018 noted above and U.S. patent application Ser. No. 15/957,202 filed Apr. 19, 2018 also noted above. These figures show the two fundamental module types this disclosure uses for isolation along a single axis.

Figure 10A:
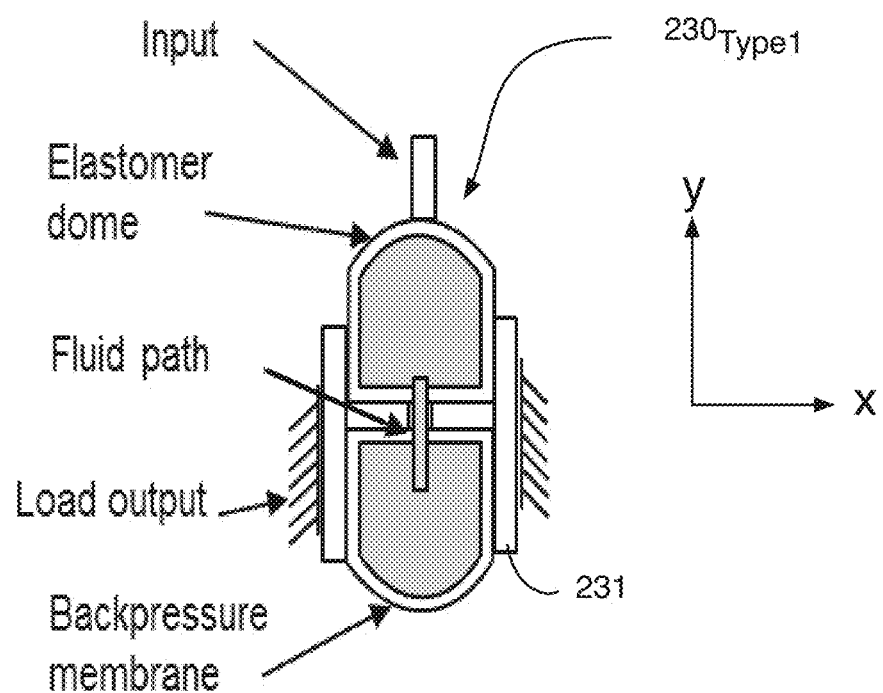
FIGS. 10a and 10b are representations of fundamental modules or versions of elasto-hydraulic isolators showing two principle embodiments of single axis isolators. In practice, multiple units are used in different orientations to provide controller isolation from disturbances from any orientation. The elasto-hydraulic isolators of FIGS. 10a and 10b are preferably orthogonally arranged with respect to each other. Additional arrangements are possible as is schematically depicted by FIG. 10c.

In a Type 1 mechanical isolator $230_{Type1}$ configuration (see FIG. 10a), the load (from chassis 201, see FIG. 2) is input on the top of the isolator depicted in FIG. 10a in the direction of the y axis. This load creates a displacement of the elastomer dome which in turn provides isolation stiffness and damping. The stiffness is provided by the material and geometry of the elastomeric dome while the damping comes from pumping fluid through the path. By manipulating the fluid path geometry and/or the fluid properties, the level of damping and its frequency dependence can be controlled. The mechanical load is transferred to the perimeter load output path 235 through both the fluid and the elastomer. A backpressure membrane creates a restoring force to the fluid, pumping the fluid back through the fluid path to complete a full cycle. The advantage of this configuration is that the location of the backpressure chamber is independent of the location of the primary isolation chamber as long as they are connected by the fluid path.

In a Type 2 mechanical isolator $230_{Type2}$ configuration (see FIG. 10b), the load (from chassis 201, see FIG. 2) input is located in the center of two symmetric isolation chambers. This input point is connected to elastomer (or otherwise flexible) domes that provide both an elastic isolation force and create a pumping action which forces fluid around the fluid path. As in the Type 1 mechanical isolator device, the fluid path can be manipulated to control the level of damping, added stiffness, and frequency and temperature dependence. One important difference with the Type 2 mechanical isolator, is that an input displacement or force creates a push response on one membrane and a simultaneous pull response on the opposite membrane leading to a double action on the fluid and thus enhancing the damping capacity. For this arrangement, the elastomeric domes can be made very soft without significantly compromising their ability to pump fluid. However, the two isolation chambers need to be located opposite the input connection point.

Figure 10B:
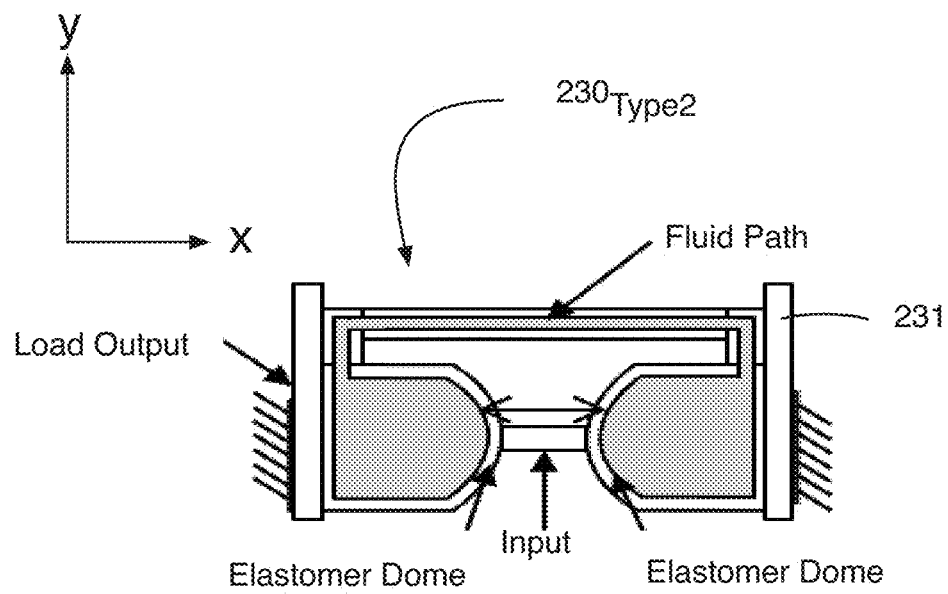

The materials and design of the modules depicted by FIGS. 10a and 10b may vary depending on the application requirements in terms of stroke, temperature, weight, force, etc. In the preferred embodiment, the pumping membrane is created from elastomer materials such as silicone rubber blends or urethane with elastic modulus of 10 to 100 MPa. In some embodiments the entire hydraulic chamber is molded of a single continuous member of this elastomer material. Alternatively, the membrane can be composed of an embossed metal sheet with the desired out of plane and in plane stiffness properties. This membrane would be mounted to a hydraulic chamber which would be then connected to the channel fluid path to enable the pumping action.

Figure 10C:
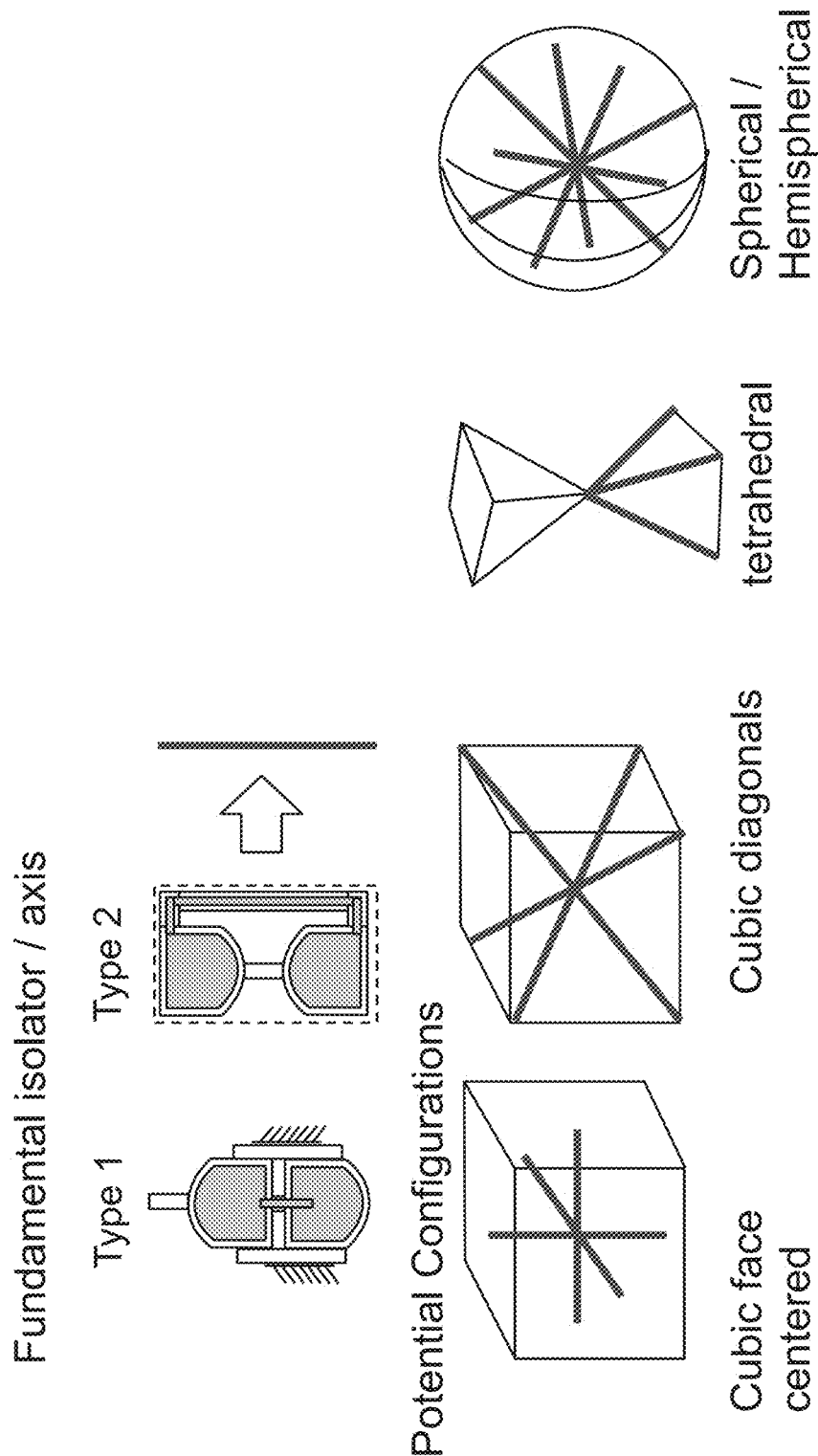

To achieve multi-axis isolation, it is preferred that the single axis units are assembled and connected together. See, for example, U.S. Provisional Application Ser. No. 62/524, 867 filed Jun. 26, 2017 and entitled "Multi Degree of Freedom Vibration Isolator" and its related Non-Provisional application Ser. No. 16/004,854 filed Jun. 11, 018, each of which is incorporated herein by reference, for a more detailed discussion of embodiments of multi-axis mechanical isolators. In the simplest embodiments, enhanced damping is achieved when the force or vibration axis is aligned with the axis orthogonal to the membrane. To achieve enhanced properties in multiple directions our invention assembles multiple units in different directions whereby that hydraulic pumping is achieved. There are several different configurations that can be considered for this assembly, with advantages that depend on the specific application constraints. FIG. 10c shows schematics of potential configurations with multiple single-axis isolation isolators. In these configurations, various combinations of Type 1 and Type 2 isolators 230 are possible. In the first configuration, similar to the embodiment described in detail later in the disclosure, we have essentially a rectilinear configuration of 3 isolator modules. In the vertical axis one can use a Type 1 isolators and apply loads in this direction. In the lateral directions, one may utilize opposing Type 1 isolators (4 total) on all sides or two Type 2 isolators with the fluid return path winding around the perimeter of the device. While a cube is shown for simplification purposes, the outer surface where the load is received could be a cylinder as well, suitable for some applications. By varying the relationship between the stiffness and damping of the different planes of isolator modules, the overall stiffness and damping in different directions may be controlled.

Other potential configurations, also shown in stick form by FIG. 10c for simplicity, include the tetrahedron family, shown as the diagonals of a cube or a triangular tetrahedron. This relationship provides different symmetry than the orthogonal configuration described previously. In this case, if the principle load direction is vertical, for example, all isolator modules will have some fluid pumping associated with force application. In the prior symmetry, if the load is aligned along one of the principle directions, only one pair of modules will be induced to pump fluid. This is because the membranes only pump fluid in the direction normal to the bulge membrane plane. Lateral motion creates fluid displacement that is balanced on both sides and results in effectively zero fluid transport. In these cases, the load is reacted only by the elastic properties of the mount and the fluid does not strongly participate. In terms of module type configuration, the square tetragonal (cubic diagonal) form is naturally compatible with the Type 2 isolators, while the triangular face tetragonal is more suited to Type 1 isolators.

Ultimately, if manufacturing methods permit, the mount could use an arbitrary number of isolators 230 that could be oriented along various angles within a spherical symmetry. This method could provide the most uniform stiffness response by smoothing out orientation effects. A full spherical symmetry would favor the Type 2 isolators, while a hemispherical symmetry would match the Type 1 isolators configuration.

Measured Depth Acquisition

A parameter which can help with estimation of wellbore trajectory is Measured Depth (MD). See, for example, element 250 on FIG. 11a. This is essentially the amount of drill pipe that has been connected in a drill string, so it is very easy to measure at the surface from the drilling rig, as is often done in the prior art. A method which is mentioned herein is to measure the time of flight propagation of the mud pulses from downhole-to-uphole and back by processing the downhole pressure transducer data. See block 252. The determination of measured depth may be determined by analyzing the time of flight between acoustic pulses generated by the downhole mud pulser as measured by the environmental sensor package 240 mud pressure transducer 243 and the received surface echo as is disclosed U.S.

Provisional Application Ser. No. 62/477,344 filed 3/271/2017 and entitled "System for determination of Measured Depth (MD) in wellbores from downhole pressure sensors using time of arrival techniques" and its related Non-Provisional application Ser. No. 15/881,700 filed Jan. 26, 2018, each of which is hereby incorporated herein by reference.

Embodiments of the presently disclosed CTCDD system leverages existing technologies and downhole components to acquire measured depth to be used as rate of penetration or distance traveled to resolve the errors associated with a minimum curvature method interpolation. Pressure sensors monitor reflected pressure pulses from the pulser and uses the cumulative phase delay to ascertain travel time. This method forgoes any need for transmitters from the surface to send measured depth down to the directional module. Pressure pulse detection can make embodiments of the presently CTCDD disclosed system completely self-contained. Distance traveled can be used for all varieties of trajectory calculations, both in survey mode and continuous mode.

Integrated Position, Navigation, and Timing with MEMS Gyroscope

Conventional surveys taken with magnetometers and accelerometers are hampered by uncertainty in the actual direction of the magnetic field vector at a given depth. It is assumed to be the same as the magnetic field vector at the surface. A fully integrated position, navigation, and timing system centered on MEMS gyroscopes 203 will provide a secondary measurement of azimuth without susceptibility to magnetic vector uncertainty. The gyroscopic measurement of Earth angular rate will be fused with the magnetic measurement to derive an optimal BHA attitude estimate. Embodiments of the presently disclosed system may include a fully integrated Position, Navigation & Timing (PNT) system to replace the industry standard magnetometers and accelerometers in an MWD system (see the larger sensors depicted by FIG. 12) as is discussed below with reference to U.S. Provisional Patent Application Ser. No. 62/451,019 Filed Jan. 26, 2017 and entitled "Opportunistic Sensor Fusion Algorithm For Autonomous Guidance While Drilling" and its related Non-Provisional application Ser. No. 15/823,489 filed Nov. 27, 2017, each of which is incorporated herein by reference. The disclosed PNT system preferably includes navigation-grade triaxial accelerometers 202, gyroscopes 203, and a low-noise clock to acquire position of the wellbore under continuous mode by running either inertial navigation (acquire angular velocity and acceleration and integrate by time to calculate position) or incremental trajectory estimate algorithms. See U.S. Provisional Patent Application Ser. No. 62/427,561 filed Nov. 29, 2016 and entitled "Incremental Trajectory Estimation Based on Real Time Inertial Sensing" and its related Non-Provisional application Ser. No. 15/825,067 filed Nov. 28, 2017, each of which is incorporated herein by reference (hereinafter referred to as the ITE applications). Under survey modes, the same PNT can estimate BHA attitude and position using magnetic compassing or gyrocompassing methods as taught, for example, in Introduction to Wellbore Positioning by Angus Jamieson/UHI Scotland. The PNT's gyroscopes may be based on the solid-state silicon disk resonators disclosed by U.S. Provisional Application Ser. No. 62/461,715 filed Feb. 21, 2017 and its related Non-Provisional application Ser. No. 15/897,819 filed Feb. 15, 2018, each of which is incorporated herein by reference which are less prone to damage and/or instabilities against typical shock and vibration found downhole as there is reduced mass and minimal moving components compared to traditional spinning-mass gyroscopes commonly used in the Oil and Gas industry. Alternative gyroscope designs are referenced elsewhere in this document.

Data Collection, Signal Processing and Error Minimization Techniques

Figure 11:
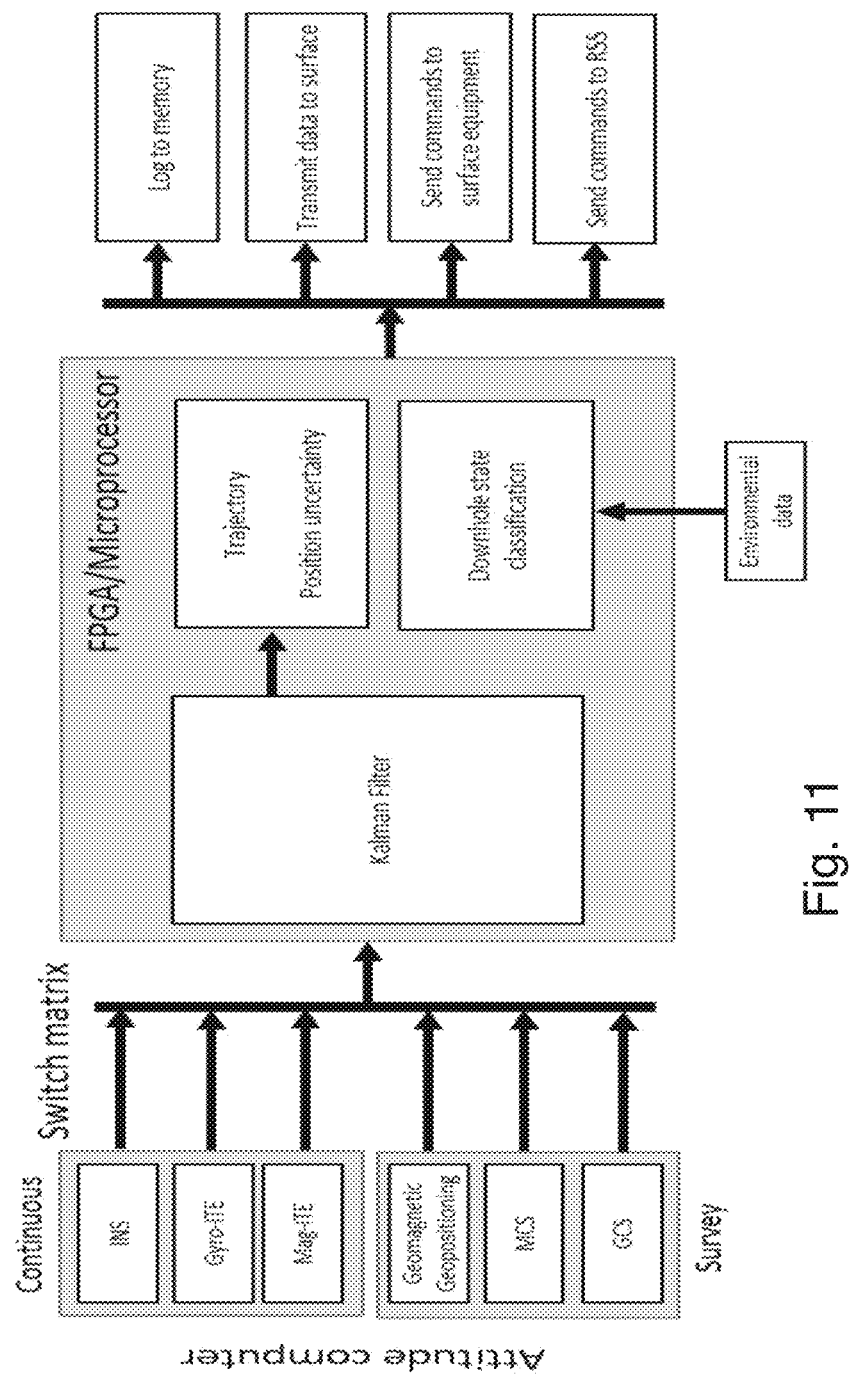
FIG. 11 shows an embodiment of an operational sequence once sensor data has passed through the DSP for signal conditioning.
Figure 11A:
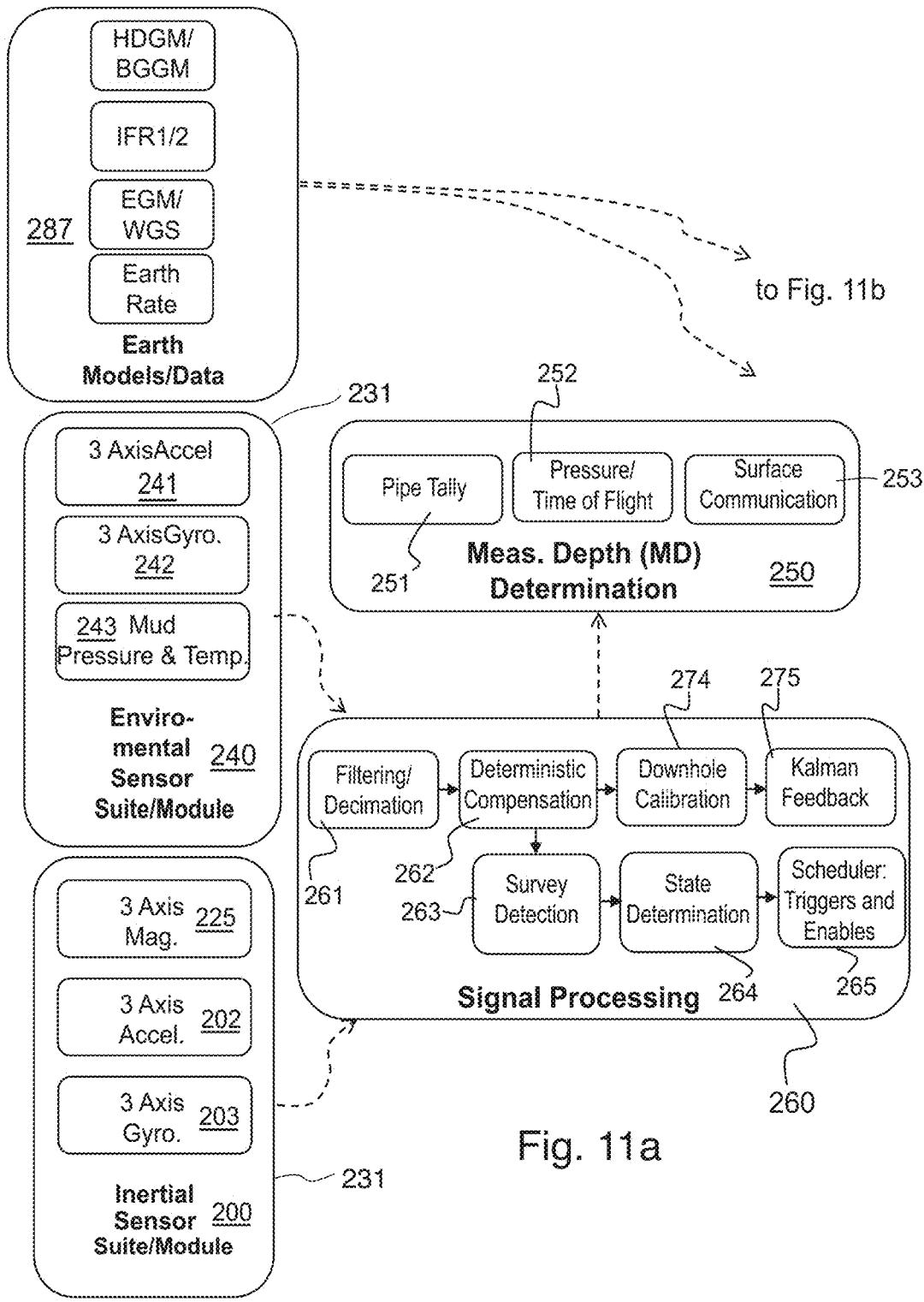
FIG. 11a is an illustration of the Sensor Fusion Algorithm (SFA), including an environmental sensor package, an inertial sensor package, signal processing, and measured depth determination, according to some embodiments of the present disclosure. The RSS in the figure is a Rotary Steerable System at the drill bit.

Data Collection and Signal Processing will now be described with reference to FIGS. 11a-11d. As shown in FIG. 11a, the two sensor packages (inertial 200 and environmental 240) acquire and stream data from their respective sensors. The Inertial Sensor Suite (or Module) 200 acquires data from its high precision sensors preferably at approximately 100 Hertz (Hz), while the Environmental Sensor Suite (or Module) 240 acquires data from high range, lower precision sensors preferably at 1000 Hz. Thus, the key distinguishing features between the Environmental Sensor Suite (or Module) 240 and the Inertial Sensor Suite (or Module) 200 are the rate of data acquisition and the accuracy and precision levels of the accelerometers and gyroscopes associated within each. Furthermore, the Inertial Sensor Suite (or Module) 200 has at least a three-axis high performance magnetometer 225 while the Environmental Sensor Suite (or Module) 240 may omit a magnetometer but adds a pressure and temperature transducer 243 which is in contact with the circulating drilling fluid (i.e., the "mud").

As shown in FIG. 11a, the sensor data streams are fed to a signal preprocessing apparatus 260 (see also FIG. 9) which is programmed to first synchronize, align, filter, and decimate 261 (i.e., downsampling with appropriate filtering using for example a DSP) the data to approximately one second time periods. A deterministic compensation 262 is applied using the scale factor, misalignment, and bias coefficients obtained from laboratory calibration testing over temperature. This process converts the raw voltage signals obtained from analog-to-digital converters (not shown) connected to the sensors 202, 203 and 225 into engineering units corresponding to the sensor type. Accelerometers 202 & 241 measure acceleration in units of meters/seconds squared (m/s2) or standard "g"s. Gyroscopes 203 & 242 measure rotation rates in units of degrees per second or degrees per hour. Magnetometers 225 measure magnetic fields in units of Teslas. Pressure (see element 243) is measured in Pascals or Pounds per Square Inch (PSI). Temperature (also see element 243) is measured in degrees Celsius or degrees Fahrenheit.

These raw sensor outputs from the multi-axis accelerometers 202, gyroscopes 203, and magnetometers 220 may have deterministic instrument errors called bias errors (or scale factor errors). For the case of magnetometers, these errors can be categorized as remnant errors, which appear as a bias error, and induced errors, which appear as scale factor errors. The errors may change with the working environments, such as the presence of local magnetic interference. Further, these errors contribute to uncertainties in the estimated trajectories. These can be identified by comparing the theoretical physical parameters with the measured physical parameters based on raw sensor output data. Non-limiting examples of raw sensor data include magnitudes and orientations of the local gravitational field, magnetic field vectors, and earth rotation rate. The differences in the values can be used to deduce the sensor errors. Deterministic compensation 262 preferably also seeks to remove or reduce these errors in addition to converting the raw voltage signals (output data) obtained from analog-to-digital converters (not shown) connected to the sensors 202, 203 and 225 into engineering units corresponding to the sensor type. See, for example, U.S. Provisional Application Ser. No. 62/233,936 filed Sep. 28, 2015 and entitled: "Real Time Trajectory Estimation With Multi-Station Analysis" and its related Non-Provisional application Ser. No. 15/279,390 filed Sep. 28, 2016 each of which is hereby incorporated herein by reference, for a disclosure of both prior art and new techniques for reducing such deterministic instrument errors.

After applying deterministic compensation 262 to all of the sensor streams, the signal preprocessing block 260 then calculates sensor statistics (e.g., standard deviations, means, Allan deviations) using the one second time windows. A buffer is running during this time which collects a longer duration (preferably >1 second) window of sensor data. When variance of the data contained in the buffer is less than a certain threshold (the particular combination and thresholds can be set depending on the desired sensor types to be used), the buffer is deemed to contain a survey (survey detection 263). Referring to FIGS. 11*a*-11*d*, the mean value and standard deviation of the survey is recorded in a separate survey table 263 (in memory 290) for each sensor type. The state of the system is determined to be in survey mode at this point (see state determination block 264). Therefore, the scheduler 265 triggers and enables the survey mode algorithms which operate on the survey table 263 data.

Figure 11B:
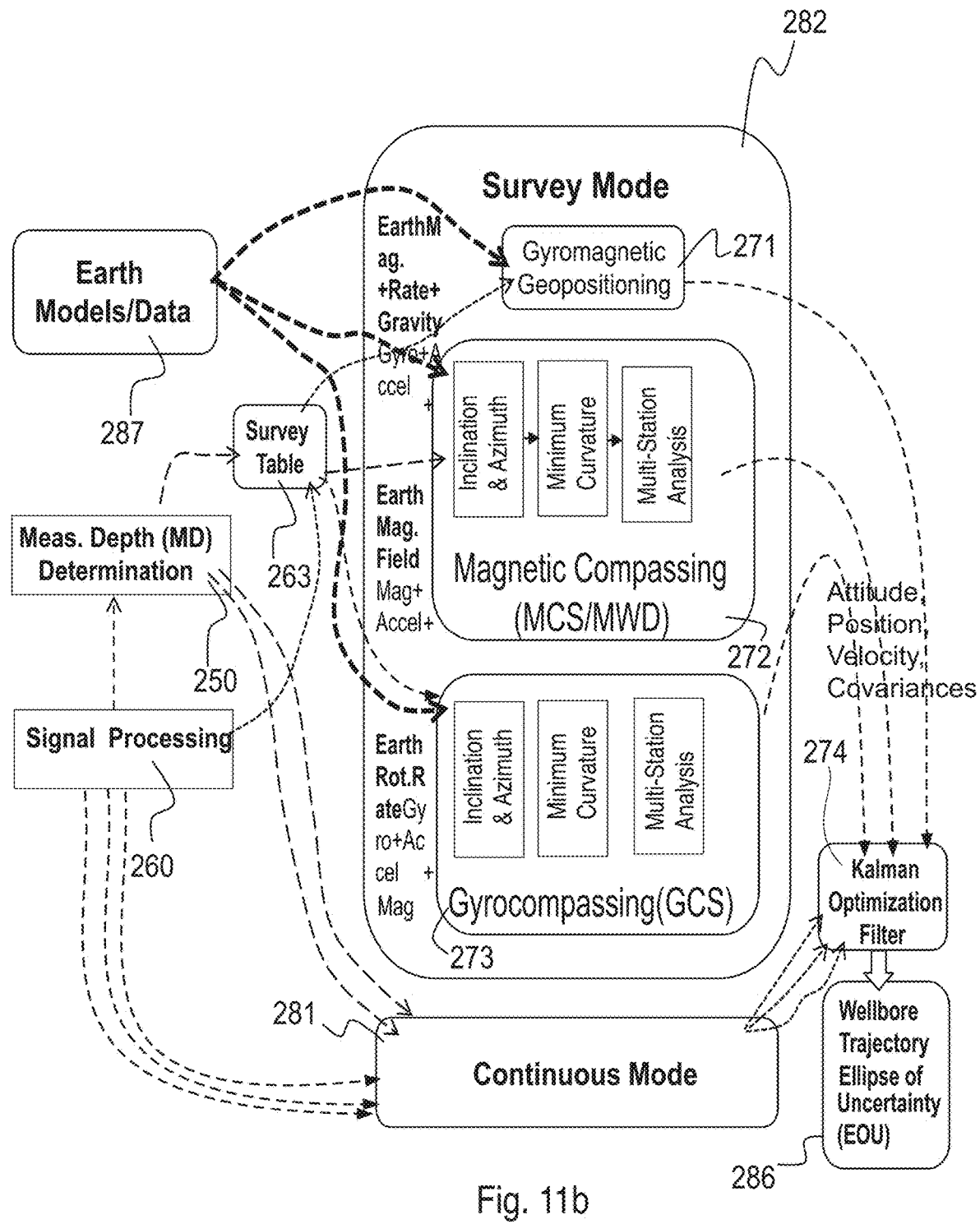
FIG. 11b is a diagram of the SFA in a Survey Mode of operation, according to some embodiments of the present disclosure.

As depicted in FIG. 11*b*, there are three possible survey mode positioning algorithms: (1) gyromagnetic geopositioning 271 (described in U.S. Provisional Application Ser. No. 62/233,936 filed Sep. 28, 2015 and entitled: "Real Time Trajectory Estimation With Multi-Station Analysis" and its related Non-Provisional application Ser. No. 15/279,390 filed Sep. 28, 2016 each of which is hereby incorporated herein by reference), (2) magnetic compass surveying with minimum curvature (the industry standard algorithm) (MCS/MWD 272), and (3) gyrocompass surveying (GCS) 273. MCS/MWD is described in Introduction to Wellbore Positioning by Angus Jamieson/UHIScotland, pages 39-41 and 188 and BP-Amoco Directional Survey Handbook, section 5.2, which are incorporated herein by reference. GCS is described in Introduction to Wellbore Positioning by Angus Jamieson/UHI Scotland, page 70 and BP-Amoco Directional Survey Handbook, sections 5.4 and 5.6, which are incorporated herein by reference. Additionally, if needed, the Kalman optimization filter 274 is put into its measurement configuration.

When the system is not in survey mode, the scheduler 265 places the system in continuous mode 281. In continuous mode 281, the sensor data streams are fed continuously into the various navigation algorithms at the native sampling rates (e.g., 100 Hz), rather than being placed in the survey table 263. A real-time navigation solution is obtained in continuous mode 281, compared with survey mode 282 which only is triggered when the drilling operation is stationary.

Figure 11C:
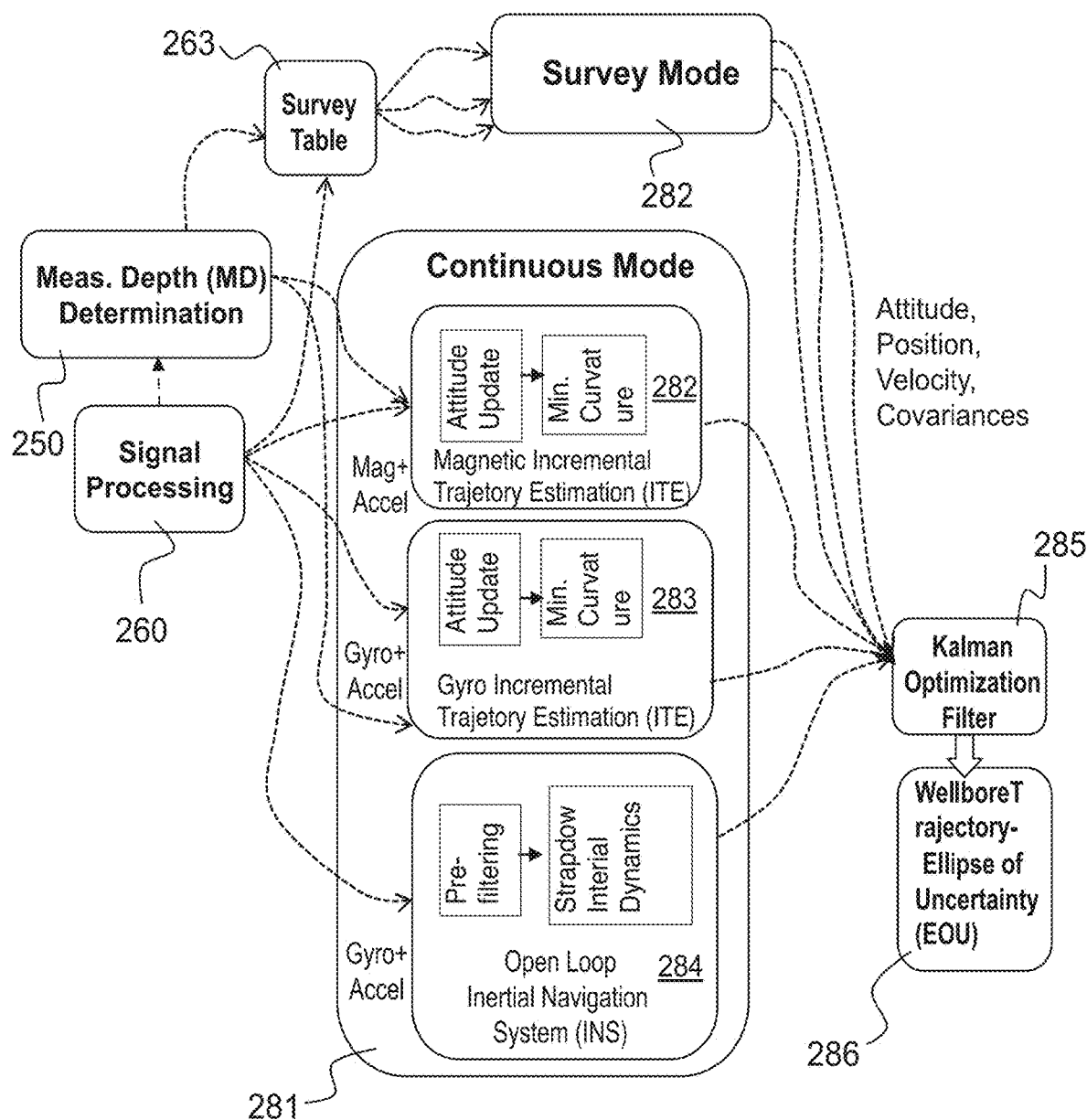
FIG. 11c is a diagram of the SFA in a Continuous Mode of operation, according to some embodiments of the present disclosure.
Figure 11D:
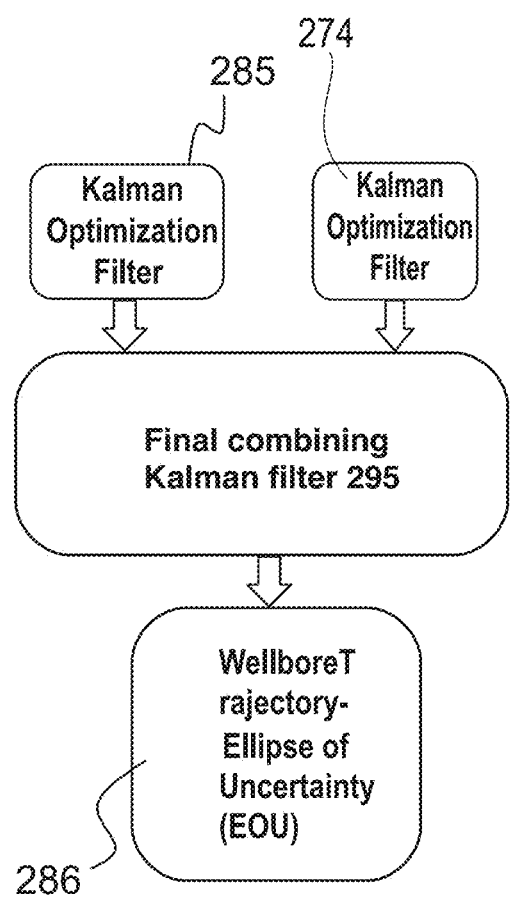
FIG. 11d depicts an alternative embodiment of the Kalman filter.

Turning now to FIG. 11*c*, there are three possible continuous mode navigation algorithms: (1) Magnetic-based Incremental Trajectory Estimation (Mag-ITE) 282, (2) Gyrobased Incremental Trajectory Estimation (Gyro-ITE) 283, and (3) an InertialNavigation System (INS) 284. The ITE methods are disclosed in the ITE applications identified above. In continuous mode 281, the Kalman optimization filter 285 operates in a streaming manner, fusing the last known position from survey mode 282 with the continuous mode 281 navigation algorithm estimates (from elements 282, 283, and 284) to provide a better estimate of the overall system position 286 in real-time.

The various positioning/navigation algorithms in some cases require reference data of the Earth's gravitational field, magnetic field, and rotation rates. There is a separate block (Earth models/data 287) which handles making that data available to the algorithms as needed.

The two Kalman filters 274 and 285 depicted on FIGS. 11*b* and 11*c* may be implemented as a monolithic Kalman filter to fuse some or all of the three survey mode 282 with all or some of the three continuous mode 281 navigation and positioning algorithms instead as separate filters as depicted. Alternatively, they may be implemented as separate filters (as depicted . . . see also FIG. 11*d*) associated together with a master Kalman filter 295 which is formed by cascaded sub Kalman filters 274 & 285. The three (or one or more) of the survey mode positioning algorithms (elements 271, 272, and 273) feed a survey mode Kalman filter 274 and the three (or one or more) of the continuous mode navigation algorithms (elements 282, 283, and 283) feed a continuous mode Kalman filter 285. The output of these two Kalman filters 274, 285 are then fed into a final combining Kalman filter 295, which is preferably at least fifteen states (three positions, three velocities, three attitude angles, three accelerometer biases, and three gyroscope biases) and can be up to thirty states in some implementations (the previous fifteen states plus scale factor and misalignment terms for the gyroscopes and accelerometers).

Measurements obtained from the multi-axis accelerometers 202, gyroscopes 203, and magnetometers 220 (which allow determination of the drill head trajectory) are logged in the survey table 263 associated with the data processor 270. The logged measurements include older measurements and recent measurements, and in the case of magnetometers also includes the reference magnitude for each measurement.

In the Signal Preprocessing (SPP) block 260, prior to sending the sensor signal streams to the Continuous Mode navigation algorithms 281 or to the Survey Mode Survey Table 263 a second level of sensor compensation is preferably applied. This is referred to as Downhole Calibration 274 and is disclosed in U.S. Provisional Application Ser. No. 62/477,327 filed Mar. 27, 2017 and entitled "Adaptive Downhole Inertial Measurement Unit Calibration Method and Apparatus for Autonomous Wellbore Drilling" and its related Non-Provisional application Ser. No. 15/897,907 filed Feb. 15, 2018). After applying the Downhole Calibration 274, the residual gyro and accelerometer bias estimates obtained from the Kalman Filter 274, 285 can be subtracted off (Kalman Feedback 275). Thus, embodiments of the presently disclosed CTCDD system has the unique feature of three levels of calibration ranging from coarse to ultrafine: Deterministic Calibration/Compensation 262 based on laboratory testing in various environments covering the expected downhole environmental ranges, Downhole Calibration 274 based on the data stored in the Survey Table 263 and a real-time Continuous Mode 281 calibration provided by the Kalman Filter 285.

With the SPP block 260, sensor data are calibrated, deterministic errors (i.e. temperature dependent, g-dependent) are removed, and random errors are quantified allowing the navigation computer to correctly estimate the trajectory and the position uncertainty or EOU based on the quantified statistical error.

To calculate the current position of the drill string along the estimated trajectory, the navigation computer takes in the calibrated sensor data (gravity vector from accelerometer, magnetic vector from magnetometer, and earth rotation vector from gyroscope) and calculates the BHA attitudes (inclination, azimuth, and tool face angle. The computer incorporates the measured depth or distance added since the last survey alongside the BHA attitude to interpolate a smooth trajectory between the current and previous survey points.

The Attitudes, Positions, Velocities, and their respective Covariances obtained from each navigation algorithm in Continuous Mode 281 or Survey Mode 282 are fed into the Kalman Filter which performs an optimized fusion depending on which mode it is operating in and how uncertain each particular navigation is based on the sensor inputs and derived system state. The Kalman Filter can have various architectures depending on the order in which the navigation algorithms are to be fused. The final output of the Kalman Filter is an optimized Wellbore Trajectory or path and its companion residual Ellipse of Uncertainty (EOU), which typically demarks the 2-sigma 95% confidence bounds of the wellbore position (and path) in all three spatial dimensions. FIGS. 11a-11d show the operational sequence once sensor data has passed through the DSP 330 for signal conditioning.

Full Autonomy

Full autonomy and guidance enabled by sensor clusters combining precision and accuracy from the presently disclosed system with real-time processing and state estimation enabling full system control at the drill bit. Full autonomy would likely leverage the entire sensor system disclosed herein including the inertial and environmental sensors and then transmit a series of commands directly to the drill string to adjust key drilling parameters based on a predetermined decision tree.

Sensor Package

Preferred embodiments according to the principles of the present invention utilize a fully integrated yet compact sensor suite 200 consisting of an Inertial measurement unit (IMU) and magnetic compass as described by U.S. Provisional Application Ser. No. 62/461,715 filed Feb. 21, 2017 and entitled "MEMS-based Inertial Measurement Unit (IMU) Sensor Suite for Downhole Navigation" and its related Non-Provisional application Ser. No. 15/897;819 filed Feb. 15, 2018, each of which is incorporated herein by reference. The chip-scale MEMS sensors provide position and attitude data in a more compact form factor than prior art Attitude and Heading Reference Systems (AHRS) or Inertial Navigation Systems (INS). Whereas prior art sensor systems consist of discrete sensors and their electronics assembled in a relatively large footprint, the chip-scale MEMS sensor suite disclosed in the above mentioned US provisional and non-provisional patent applications integrates multiple sensors directly with the electronics onto 1 in$^3$ dice. Each dice provides three axis measurements of acceleration, Earth's rotational rate in the coordinates frame of the Sensor Suite 200 or magnetic field. Finally, each chip-scale sensor may be individually hermetically sealed or vacuum packaged.

The chip-scale MEMS sensor suite in the above mentioned US provisional and non-provisional patent applications can supplant discrete sets of accelerometers and magnetometers found in traditional measurement while drilling (MWD) survey tools used in the Oil and Gas Industry. Standard MWD tools employ a linear assembly of discrete accelerometers and magnetometers (see FIG. 1A) with each sensor measuring a vector component of gravity or Earth magnetic field respectively. The standard 1.875-inch-diameter chassis that normally fits into a 3.5" drill collar limits the available options for sensor placement along the chassis axis, forcing the length to extend beyond two feet to accommodate all six sensors and their corresponding electronics which are also not positioned in an optimal manner due to space limitations.

With the volume reduction illustrated in FIG. 1B, embodiments according to the principles of the present invention demonstrate better integration of the sensors with electronics and allow automating the assembly process. The three accelerometers 206, 207, 208 are preferably packaged and assembled onto a sensor cube (a dice) or polyhedron measuring 1 in$^3$·0.65×0.65 in$^2$ accelerometer MEMS chiplets are attached to the faces of the cube such that they are precision aligned along the orthogonal axes. This same assembly and configuration are applied to the magnetometers and any other MEMS sensors that could fit within the one square inch area of the cube face. Embodiments according to the principles of the present invention also includes three axis MEMS gyroscopes that are not found in conventional measurement while drilling (MWD) survey tools but would provide another independent source besides the magnetometer for azimuthal measurement. FIG. 1 shows each sensor cube hosting a three axis set of sensors that measures the full vector of a particular measurement. However, other configurations are possible including grouping different sensors types based on their orientation along a particular axis. In one preferred embodiment, each sensor type will be placed in its own cube as shown in the figure. However, another embodiment can have a cube comprising a gyroscope, magnetometer, and accelerometer along a single axis. In another embodiment duplicate sensors may be placed on the same cube for redundancy, or a cube may host more sensors to reduce over all noise by sqrt(N), or position two sensors along same axis but in opposite directions to separate and eliminate bias errors. A rigid flex printed circuit board (PCB) not only holds the sensors in place and allows the sensors to fold onto the sensor cube but also allows the signal conditioning circuitry to be placed directly at the sensor packages to maintain signal integrity. Generally, the signal conditioning circuitry may comprise a microprocessor, filters, and associated analog to digital converters and digital to analog converters. Embodiments according to the principles of the present invention enable minimization of spatial-dependent errors between sensors such as stress and temperature gradients by reducing the distance across sensors.

Turning again to FIG. 1B, in the illustrated embodiment of the sensor suite 200, the three uniaxial accelerometers 206, 207, 208 include a first MEMS accelerometer 206 configured to measure a vector component of gravity along an x-axis, a second MEMS accelerometer 207 configured to measure a vector component of gravity along a y-axis orthogonal to the x-axis, and a third MEMS accelerometer 208 configured to measure a vector component of gravity along a z-axis orthogonal to both the x-axis and the y-axis. In the illustrated embodiment, the uniaxial MEMS accelerometers 206, 207, 208 are aligned with the x-, y-, and z-axes, respectively, of the accelerometer cube such that the uniaxial MEMS accelerometers 206, 207, 208 have mutually orthogonal orientations. Together, the uniaxial MEMS accelerometers 206, 207, 208 define a triaxial MEMS accelerometer configured to measure or determine an orientation of the three axis accelerometer 202 with respect to the gravitational field of Earth.

The faces 205 of the accelerometer sensor polyhedron 204 of the three axis accelerometer 202 are defined by circuits 209, 210, 211 on which the uniaxial MEMS accelerometers 206, 207, 208, respectively, are mounted. In one or more embodiments, each of the circuits 209, 210, 211 may be a flex circuit or a rigid flex printed circuit board as will be described below.

The three axis gyroscope 203 of the MEMS-based sensor suite 200 preferably includes a gyroscope sensor polyhedron (preferably having a cubical shape) or die 212 having a series of faces 213 and three uniaxial MEMS gyroscopes 214, 215, 216 on three face 213 (e.g., three mutually orthogonal faces) of the gyroscope sensor polyhedron 212. In the illustrated embodiment, the three uniaxial gyroscopes include a first MEMS gyroscope 214 configured to measure a vector component of Earth's rotation along an x-axis, a second MEMS gyroscope 215 configured to measure a vector component of Earth's rotation along a y-axis orthogonal to the x-axis, and a third MEMS gyroscope 216 configured to measure a vector component of Earth's rotation along a z-axis orthogonal to both the x-axis and the y-axis. In the illustrated embodiment, the uniaxial MEMS gyroscope 214, 215, 216 are aligned with the x-, y-, and z-axes, respectively, of the gyroscope sensor polyhedron 212. Together, the uniaxial MEMS gyroscopes 214, 215, 216 define a triaxial MEMS gyroscope configured to measure or determine a heading of the MEMS-based sensor suite 200 with respect to Earth's rotation (e.g., the triaxial MEMS gyroscope may be configured to perform an inclination measurement).

The faces 212 of the gyroscope sensor polyhedron 212 of the three axis gyroscope 203 are defined by circuits 217, 218, 219 on which the uniaxial MEMS gyroscopes 214, 215, 216, respectively, are mounted. In one or more embodiments, each of the circuits 217, 218, 219 may be a flex circuit or a rigid flex printed circuit board.

The three axis magnetometer 220 of the MEMS-based sensor suite 200 includes a magnetometer sensor polyhedron (e.g., a cube) or die 221 having a series of faces 222 and three uniaxial magnetometers 223, 224, 225 on three faces 222 (e.g., three mutually orthogonal faces) of the magnetometer sensor polyhedron 221. In the illustrated embodiment, the three uniaxial magnetometers include a first MEMS magnetometer 223 configured to measure angular velocity about an x-axis (e.g., a roll axis), a second MEMS magnetometer 224 configured to measure angular velocity about a y-axis (e.g., a pitch axis) orthogonal to the x-axis, and a third MEMS magnetometer 225 configured to measure angular velocity about a z-axis (e.g., a yaw axis) orthogonal to both the x-axis and the y-axis. In the illustrated embodiment, the uniaxial MEMS magnetometers 223, 224, 225 are aligned with the x-, y-, and z-axes, respectively, of the magnetometer sensor polyhedron 221. Together, the uniaxial MEMS magnetometers define a triaxial MEMS magnetometer configured to measure or determine magnetic field vector at the MEMS-based sensor suite 200 and the triaxial MEMS magnetometer may be configured to perform an azimuthal measurement. In one or more embodiments, the MEMS-based sensor suite may be provided without the magnetometer 220.

The faces 222 of the magnetometer sensor polyhedron 221 of the magnetometer 220 are defined by circuits 226, 227, 228 on which the uniaxial MEMS magnetometers 223, 224, 225, respectively, are mounted. In one or more embodiments, each of the circuits 226, 227, 228 may be a flex circuit or a rigid flex printed circuit board.

Continuous Guidance and Navigation While Drilling Requires Effective Vibration Isolation While Drilling and that Isolation Requires Much Smaller and Lighter Sensors Driven primarily by volume and weight reduction, the chip-scale MEMS sensor suite 200 (described above and in in U.S. Provisional Application Ser. No. 62/461,715 filed Feb. 21, 2017 and its related Non-Provisional application Ser. No. 15/897,819 filed Feb. 15, 2018, each of which is incorporated herein by reference) addresses several key limitations intrinsic to conventional survey and navigation tools where volume constraints are limited to an outer diameter of approximately 1.875". A compact sensor suite where the sensors are more integrated through packaging would improve two key points: sensor accuracy under external environmental stimuli (thermal and mechanical) and sensor placement in optimal areas near the motor and drill bit (see FIG. 2) with potential for maximum accuracy but difficult to implement due to size constraints. Given their size comparable to that of the chassis, discrete prior art sensors are constrained to a linear arrangement along the axial length of the chassis (shown in FIG. 1A) thereby extending the chassis length to several feet in the prior art. Significant spacing between the prior art sensors adds uncertainty to the final position estimation given that the navigation algorithm assumes a single point location for the sensor suite, but in reality there may be discrepancies and offsets among the sensors. Pre-operational calibration can compensate for some of these fixed offsets, however the chassis can deform during drilling which would then require more complex real-time calibration.

A chip-scale MEMS sensor suite 200 described herein occupies 1 $in^3$ volume for each vector variable to be measured with a commensurate reduction in mass. Smaller sensor mass leads to more robust sensor operation under harsh environmental conditions such as high thermal and mechanical shock. The chip-scale MEMS sensor suite 200 enables a reduction in sensor-to-sensor misalignments, non-orthogonalities, and spatially-dependent effects such as thermal and stress gradients where sensor output can change based on their relative positions within the chassis. Another key benefit of an integrated sensor solution is the greater flexibility. Small size enables single-point insertion at optimal yet previously inaccessible locations. Prior art multi-sensor packages are available but these sensors are generally housed in the same environment which does take into account the unique operational requirements for each sensor. Embodiments according to the principles of the present invention includes custom packaging of each sensor in a separate pressure casing 231 based on their mode operation.

Figure 12:
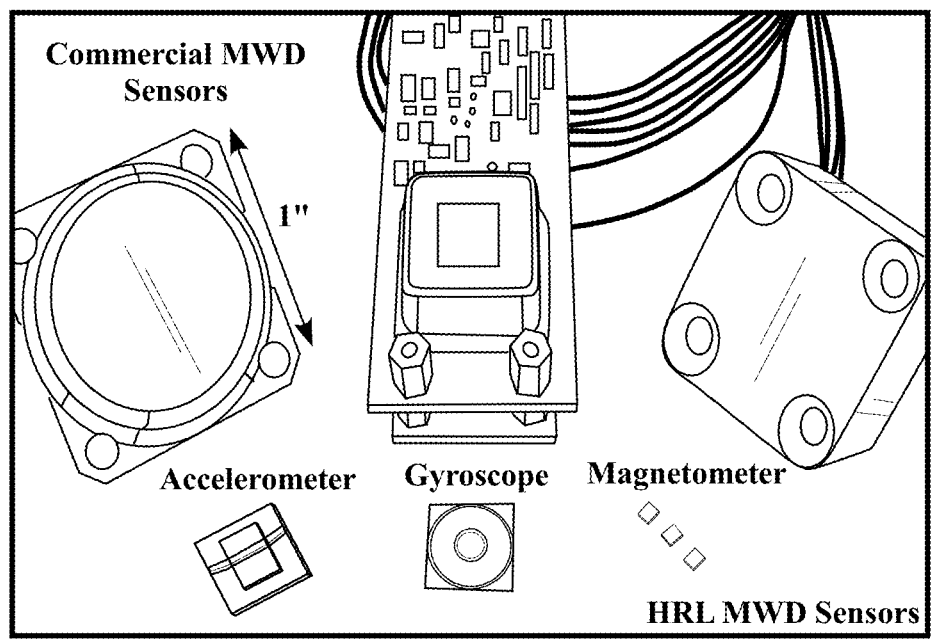
FIG. 12 is a photograph showing the size advantage of the disclosed chip-scale MEMS sensors compared to commercially available sensors.

FIG. 12 is an image showing the size advantage of chip-scale MEMS sensors (depicted in the lower portion of FIG. 12) compared to commercially available COTS sensors (depicted in the upper portion of FIG. 12). The photo shows fully fabricated accelerometer, gyroscope, and magnetometer dice prior to packaging. The size reduction of our MEMS sensors make it possible to automate the assembly of the chips onto the sensor cube. The accelerometer and gyroscopes share the same fabrication process on standard silicon-on-insulator (SOI) platform.

Figures 13A, 13B:
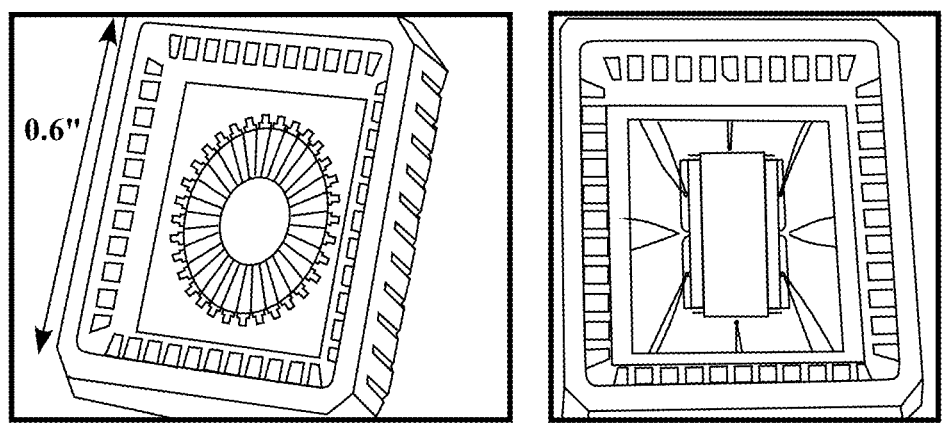
FIGS. 13a and 13b depict ceramic leadless chip carriers as shown which are preferably used for carrying the disclosed sensors.

To facilitate the configuration of three sensors onto a compact, 1 $in^3$ cubic volume shown in FIG. 1, the MEMS sensors preferably are first sealed into individual 0.65×0.65× 0.08 $in^3$ ceramic leadless chip carriers (LCC) as shown in FIGS. 13a and 13b. The individual packaging allows each sensor to operate under its own optimum environmental conditions. For instance, gyroscopes, magnetometers and other resonant-type MEMS sensors are sealed under vacuum using encapsulated getters (<1 mtorr) to preserve their high quality factors for highest sensitivity while accelerometers require only hermetic sealing under an inert gas such as nitrogen or argon to dampen unwanted oscillations.

These encapsulated MEMS sensor chips can be soldered directly to a flexible electronic board before assembly into a desired 3-D configuration using a molding structure. The electronic fabric that holds sensor chips, front-end sensor electronics and signal routing can be constructed from flex circuit or rigid flex printed circuit board, similar to a prior art example of a flexible electronic circuit shown in FIG. 14. Rigid flex allows stress-sensitive components to be placed on the printed circuit board while allowing signal routing between boards through the flexible hinges. Sensor chips can be mounted directly on the flexible material or a PCB with flexible hinges with the signal conditioning circuitry designed directly next to the sensors to maintain signal integrity. Components that can be included directly at the sensor includes microprocessors, signal amplifiers, filters, and the analog-to-digital converters (ADC). Once the sensor signals are converted into the digital domain, the digital signals route through the flexible joints to a more remote microprocessor for further processing or saved into onboard memory.

Figure 14:
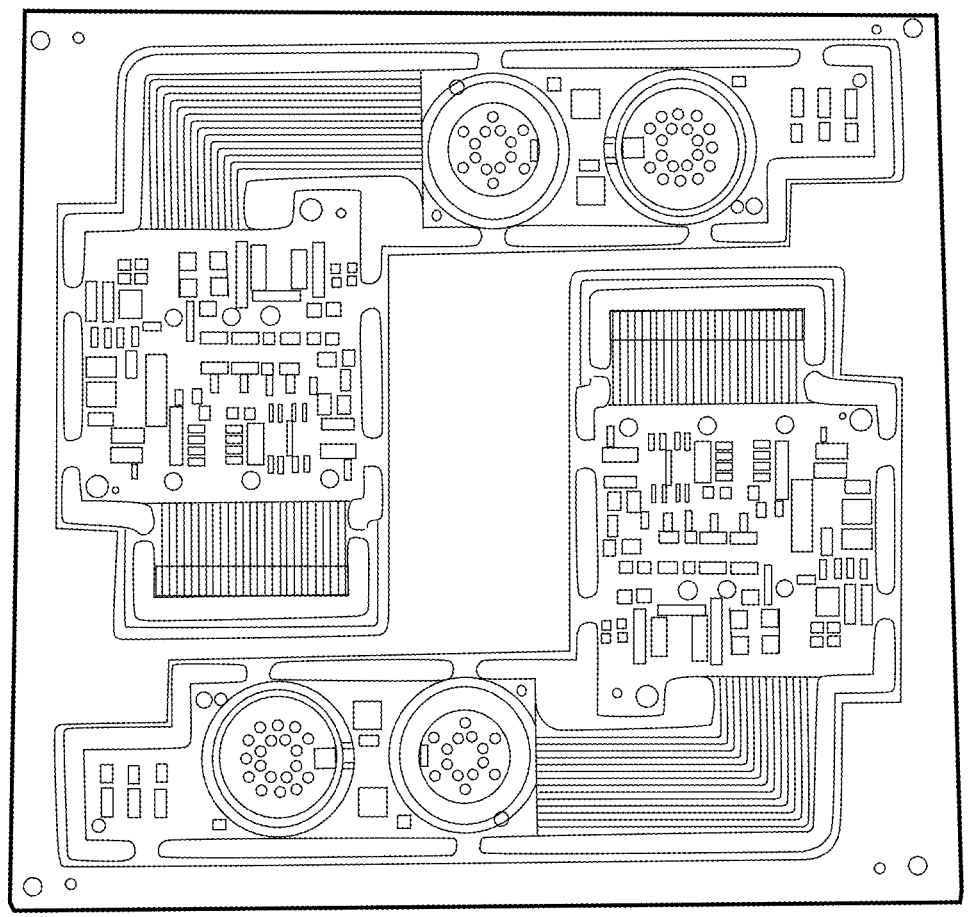
FIG. 14 depicts an example or a prior art electronic fabric that holds the sensor chips, front-end sensor electronics and signal routing which can be constructed from a flex circuit or a rigid flex printed circuit board, as shown in this photo.
Figure 15:
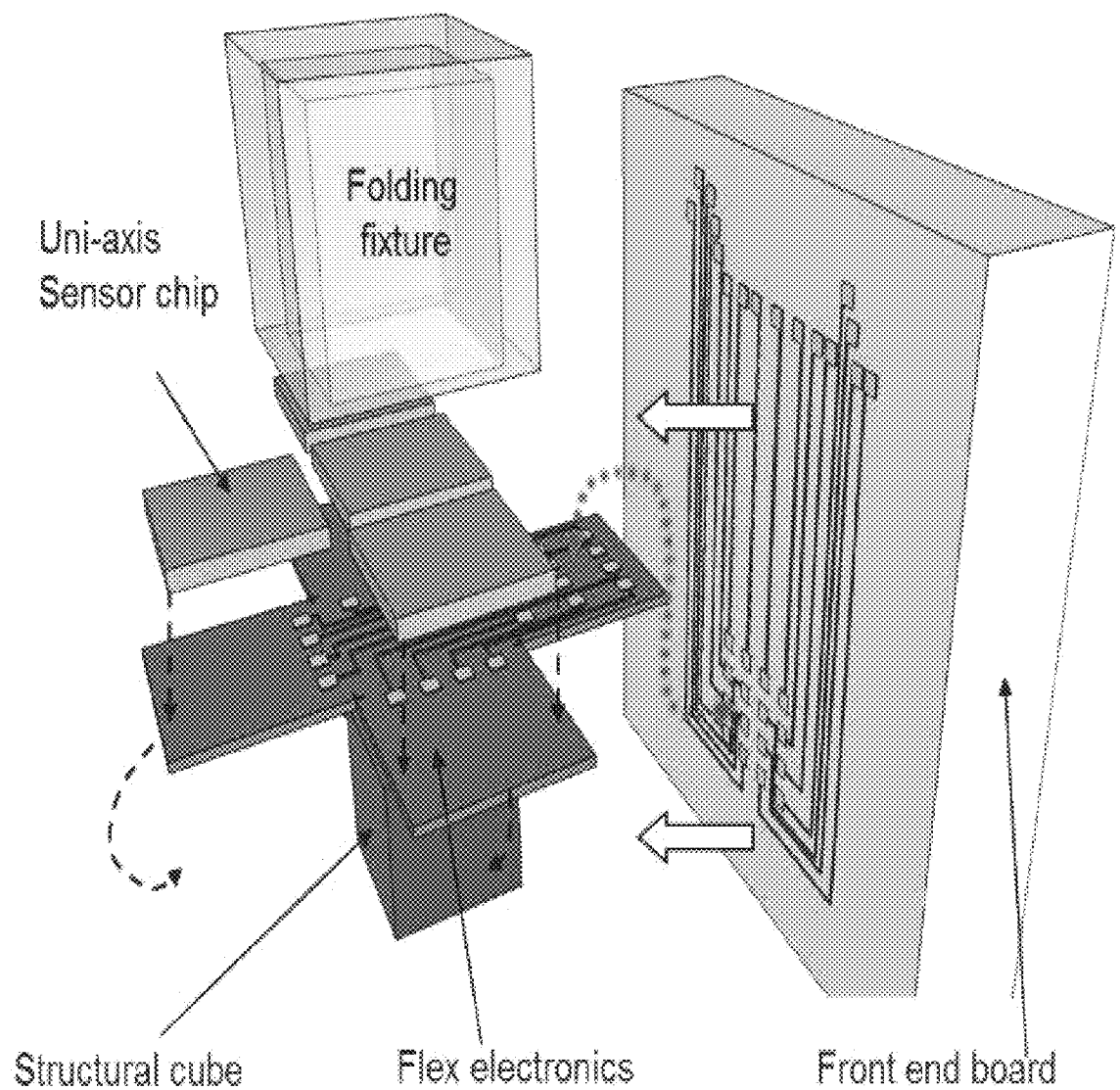
FIG. 15 shows an embodiment of an automated sensor chip assembly packaging.

FIG. 15 shows an embodiment of an automated sensor chip assembly process where the single-axis sensor chips are first soldered directly onto the rigid flex circuit as is depicted, for example, by FIG. 14. The flex circuit is sandwiched and pressed between a solid sensor cube and a slightly larger, but hollow folding fixture shown in FIG. 15. Upon insertion of the sensor cube into the fixture, the flex circuit automatically folds over the cube face and is held in place with adhesive on the either or both surfaces. Additional electronics can be placed on a separate front-end board on which the sensor cube can be mounted.

Position sensitive electronics should preferably be disposed as close to the sensor as possible (such as a transimpedance amplifier to convert current to voltage and other amplifiers). These components are placed directly onto the rigid flex PCB, directly in front or next to the sensors. A/D and D/A devices can also go on the rigid flex PCB. The front-end board can host components that are less susceptible to noise or parasitic capacitance (digital electronics and microprocessor).

The structural cube may be any high thermal conductivity material such as aluminum. The rigid flex circuit may be a commercially available product for example from www-.flexiblecircuit.com/product-category/rigid-flex/, www.epectec.com/flex/, or www.tech-etch.com/flex/.

Combining Sensor Streams to Arrive at an Estimated Trajectory of a Borehole

Recently, drilling of complicated well trajectories for boreholes has increased. A borehole is a narrow shaft bored in the ground, vertically and/or horizontally, which is constructed for a variety of purposes. There is typically a vertical section from surface, then a curve transition section from vertical to horizontal, and then a horizontal section in the oil and gas reserve. A borehole may be drilled for extraction of water, other liquids (e.g., petroleum) or gases (e.g., natural gas), or as part of a geotechnical investigation, environmental site assessment, mineral exploration, or temperature measurement.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A downhole instrument package for use with a well drilling apparatus, the downhole instrument package comprising:
   a. at least three sensors including an accelerometer, a magnetometer, a gyroscope;
   b. the accelerometer, the magnetometer, and the gyroscope being mounted in an elongate configuration along with a signal processing device, the elongate configuration being supported by shock absorbers between a drill string associated with said well drilling apparatus and a drill face of a drill bit;
   c. the instrument package having at least two modes of operation including a continuous mode and a survey mode, the continuous mode being operational at least during times that the drilling apparatus is actively drilling and the survey mode being operational at least during times that the drilling apparatus is not actively drilling;
   d. the signal processing device applying a first set of algorithms to data collected from the at least three sensors while in said continuous mode of operation, the collected data and/or the results of applying said first set of algorithms to the data detected when in said continuous mode of operation being stored as stored data by said signal processing device;
   e. the signal processing device applying a second set of algorithms, different than said first set of algorithms, to data from the at least three sensors while in said survey mode of operation to determine a calculated position of the downhole instrument package (i) from data collected from the at least three sensors while in said survey mode of operation as augmented (ii) by said stored data; and
   f. a scheduler apparatus which includes a buffer for recording a stream of sensor data from said sensors, the scheduler apparatus determining whether the instrument package is in said continuous mode of operation or is in said survey mode of operation based a determination that a variance of the sensor data in the buffer is less than a predetermined threshold.

2. The downhole instrument package according to claim 1 further including an environmental module including additional sensors which are not supported by said shock absorbers so that said additional sensors in said environmental module are more sensitive to drill string dynamics than are the at least three sensors which are supported by said shock absorbers.

3. The downhole instrument package according to claim 2 wherein data from said additional sensors is stored in an environmental data buffer.

4. The downhole instrument package according to claim 1 further including an environmental module including additional sensors which are not supported by said shock absorbers so that said additional sensors in said environmental module are more sensitive to drill string dynamics than are the at least three sensors which are supported by said shock absorbers.

5. The downhole instrument package according to claim 4 wherein the environmental module identifies quiet periods corresponding to surveys or surveys of opportunity, for controlling whether the instrument package is said survey mode of operation rather than in said continuous mode of operation.

6. The downhole instrument package according to claim 1 wherein the shock absorbers include flexible structural and hydraulic damping elements.

7. The downhole instrument package according to claim 6 wherein the flexible structural element comprises at least one elastomeric dome and the hydraulic damping element comprises a fluid.

8. A bottom hole assembly (BHA) for drilling an oilfield wellbore comprising:
a plurality of instruments further comprising accelerometers, gyroscopes, and magnetometers;
a computer configured to determine the current position of the plurality of instruments from a set of measurements produced by the plurality of instruments, the computer having at least two modes different analytical modes of analyzing the set of measurements produced by the plurality of instruments, including a continuous mode and a survey mode, the continuous mode being operational at least during times that the BHA is actively drilling and the survey mode being operational at least during times that the BHA is not actively drilling;
a scheduler apparatus which includes a buffer for recording a stream of sensor data from the plurality of instruments, the scheduler apparatus determining whether the computer is in said continuous mode of operation or is in said survey mode of operation based a determination that a variance of the sensor data in the buffer is less than a predetermined threshold; and
wherein the plurality of instruments is mechanically isolated from a drill head assembly of said BHA by one or more multi-degree of freedom vibration isolators.

9. The bottom hole assembly (BHA) of claim 8 wherein the computer applies a first set of algorithms to data collected from the plurality of instruments while in said continuous mode of operation, the collected data and/or the results of applying said first set of algorithms to the data detected when in said continuous mode of operation being stored as stored data by said computer; the computer applying a second set of algorithms, different than said first set of algorithms, to data from the plurality of instruments while in said survey mode of operation to determine a calculated position of the downhole instrument package (i) from data collected from the plurality of instruments while in said survey mode of operation as augmented (ii) by said stored data.

10. The bottom hole assembly (BHA) of claim 8 further including an environmental module including additional sensors which are not mechanically isolated by said one or more multi-degree of freedom vibration isolators so that said additional sensors in said environmental module are more sensitive to drill string dynamics than are the plurality of instruments which are mechanically isolated by said one or more multi-degree of freedom vibration isolators.

11. The bottom hole assembly (BHA) of claim 10 wherein data from said additional sensors is stored in an environmental data buffer.

12. The bottom hole assembly (BHA) of claim 9 further including an environmental module including additional sensors which are not supported by said one or more multi-degree of freedom vibration isolators so that said additional sensors in said environmental module are more sensitive to drill string dynamics than are the plurality of instruments which are mechanically isolated by said one or more multi-degree of freedom vibration isolators.

13. The bottom hole assembly (BHA) of claim 12 wherein the environmental module identifies quiet periods corresponding to surveys or surveys of opportunity, for controlling whether the computer is said survey mode of operation rather than in said continuous mode of operation.

14. A method of monitoring a well drilling operation while drilling said well, the method comprising:
collecting a set of measurements from a plurality of downhole, environmental sensors vibrationally isolated within a bottom hole assembly (BHA);
processing the set of measurements into a real time evaluation of a current location of the environmental sensors during both a continuous mode and a survey mode, the continuous mode being operational while actively drilling said well and the survey mode being operational at least during times when the well drilling operation is not actively drilling the well; and
utilizing a scheduler apparatus which includes a buffer for recording a stream of said measurements, the scheduler apparatus determining whether the well drilling operation is in said continuous mode of operation or is in said survey mode of operation based a determination that a variance of the measurements in the buffer is less than a predetermined threshold.

15. The method of claim 14, further including:
utilizing a signal processing device for applying a first set of algorithms to a set of measurements collected while in said continuous mode of operation, the collected data and/or the results of applying said first set of algorithms to the set of measurements collected while in said continuous mode of operation being stored as stored data by said signal processing device;
and utilizing the signal processing device for applying a second set of algorithms, different than said first set of algorithms, to a set of measurements collected while in while in said survey mode of operation to determine a calculated position of the downhole instrument package (i) from data collected from the set of measurements while in said survey mode of operation as augmented (ii) by the stored data.

16. A downhole instrument package for use with a well drilling apparatus, the downhole instrument package comprising:
a. at least three sensors including an accelerometer, a magnetometer, a gyroscope;
b. the accelerometer, the magnetometer, and the gyroscope being mounted in an elongate configuration along with a signal processing device, the elongate configuration being supported by one or more multi-degree of freedom shock absorbers between a drill string associated with said well drilling apparatus and a drill face of a drill bit, the one or more multi-degree of freedom shock absorbers utilizing a combination of flexible structure elements and hydraulic damping elements in multiple axes to provide isolation in multiple degrees of freedom;
c. the signal processing device applying a set of algorithms to data collected from the at least three sensors, the collected data and/or the results of applying said set of algorithms to the data collected being stored as stored data by said signal processing device.

17. The downhole instrument package according to claim 16 wherein the flexible structural elements comprise at least one elastomeric dome and the hydraulic damping elements comprise a fluid.

18. A downhole instrument package for use with a well drilling apparatus, the downhole instrument package comprising:
    at least three sensors including an accelerometer, a magnetometer, a gyroscope;
    the accelerometer, the magnetometer, and the gyroscope being mounted in an elongate configuration along with a signal processing device, the elongate configuration being supported by one or more multi-degree of freedom vibration isolators between a drill string associated with said well drilling apparatus and a drill face of a drill bit, the one or more multi-degree of freedom vibration isolators utilizing a combination of flexible structure elements and hydraulic damping elements disposed in multiple axes to provide isolation in multiple degrees of freedom;
    the signal processing device applying a set of algorithms to data from the at least three sensors to determine a calculated position of the downhole instrument package.

19. The downhole instrument package according to claim 18 wherein the flexible structural elements comprise at least one elastomeric dome and the hydraulic damping elements comprise a fluid.

20. A bottom hole assembly (BHA) for drilling an oilfield wellbore comprising:
    a plurality of instruments further comprising accelerometers, gyroscopes, and magnetometers;
    a computer configured to determine the current position of the plurality of instruments from a set of measurements produced by the plurality of instruments; and
    wherein the plurality of instruments is mechanically isolated from a drill head assembly of said BHA by one or more multi-degree of freedom vibration isolators, the one or more multi-degree of freedom vibration isolators utilizing a combination of flexible structures and hydraulic damping in multiple axes to provide isolation in multiple degrees of freedom.

21. A bottom hole assembly arranged for monitoring a well drilling operation while actively drilling said well, the bottom hole assembly comprising:
    a plurality of downhole, environmental sensors, vibrationally isolated within said bottom hole assembly, the environmental sensors arranged for collecting a set of measurements;
    a signal processing device arranged for processing the set of measurements into a real time evaluation of a current location of the environmental sensors by comparing data collected while actively drilling said well with data collected when the well drilling operation is not actively drilling the well; and
    wherein the plurality of instruments is mechanically isolated from a drill head assembly of said bottom hole assembly by one or more multi-degree of freedom vibration isolators or shock absorbers, the one or more multi-degree of freedom vibration isolators or shock absorbers utilizing a combination of flexible structures and hydraulic damping in multiple axes to provide isolation in multiple degrees of freedom.

22. The bottom hole assembly of claim 21 wherein the bottom hole assembly includes at least two modes of operation, including a continuous mode and a survey mode, the continuous mode being operational while actively drilling said well and the survey mode being operational at least during times when the well drilling operation is not actively drilling the well;
    the signal processing device being arranged for applying a first set of algorithms to a set of measurements collected while in said continuous mode of operation, the collected data and/or the results of applying said first set of algorithms to the set of measurements collected while in said continuous mode of operation being stored as stored data by said signal processing device;
    and the signal processing device being arranged for applying a second set of algorithms, different than said first set of algorithms, to a set of measurements collected while in while in said survey mode of operation to determine a calculated position of the downhole instrument package (i) from data collected from the set of measurements while in said survey mode of operation as augmented (ii) by the stored data.

23. The bottom hole assembly of claim 21, wherein said environmental sensors comprise at least three sensors including an accelerometer, a magnetometer, a gyroscope;
    the accelerometer, the magnetometer, and the gyroscope being mounted in an elongate configuration along with said signal processing device, the elongate configuration being supported by said vibration isolators or shock absorbers between a drill string associated with a well drilling apparatus and a drill face of a drill bit.

24. The bottom hole assembly of claim 21, wherein:
    said environmental sensors comprise a plurality of instruments comprising accelerometers, gyroscopes, and magnetometers; and
    said signal processing device comprises a computer configured to determine the current position of the plurality of instruments from a set of measurements produced by the plurality of instruments.

25. The bottom hole assembly of claim 24 wherein the computer has at least two different analytical modes of analyzing the set of measurements produced by the plurality of instruments, including a continuous mode and a survey mode, the continuous mode being operational at least during times that the bottom hole assembly is actively drilling and the survey mode being operational at least during times that the bottom hole assembly is not actively drilling.

26. The bottom hole assembly of claim 25 wherein the computer applies a first set of algorithms to data collected from the plurality of instruments while in said continuous mode of operation, the collected data and/or the results of applying said first set of algorithms to the data detected when in said continuous mode of operation being stored as stored data by said computer; the computer applying a second set of algorithms, different than said first set of algorithms, to data from the plurality of instruments while in said survey mode of operation to determine a calculated position of the downhole instrument package (i) from data collected from the plurality of instruments while in said survey mode of operation as augmented (ii) by said stored data.

27. The bottom hole assembly of claim 26 further including a scheduler apparatus which includes a buffer for recording a stream of sensor data from the plurality of instruments, the scheduler apparatus determining whether the computer is in said continuous mode of operation or is in said survey mode of operation based a determination that a variance of the sensor data in the buffer is less than a predetermined threshold.

28. The bottom hole assembly of claim 26, further including an environmental module including additional sensors which are not supported by said one or more multi-degree of freedom vibration isolators so that said additional sensors in said environmental module are more sensitive to drill string dynamics than are the plurality of instruments which are mechanically isolated by said one or more multi-degree of freedom vibration isolators or shock absorbers.

29. The bottom hole assembly of claim 28 wherein the environmental module identifies quiet periods corresponding to surveys or surveys of opportunity, for controlling whether the computer is said survey mode of operation rather than in said continuous mode of operation.

30. The bottom hole assembly of claim 21, wherein said environmental sensors comprise at least three sensors including an accelerometer, a magnetometer, a gyro scope;
   the accelerometer, the magnetometer, and the gyroscope being mounted in an elongate configuration along with a signal processing device, the elongate configuration being supported by shock absorbers between a drill string associated with said well drilling apparatus and a drill face of a drill bit; and
   the signal processing device applying a set of algorithms to data collected from the at least three sensors, the collected data and/or the results of applying said set of algorithms to the data collected being stored as stored data by said signal processing device; or
   the signal processing device applying a set of algorithms to data from the at least three sensors to determine a calculated position of the downhole instrument package.

31. A bottom hole assembly arranged for monitoring a well drilling operation while actively drilling said well, the bottom hole assembly comprising:
   a plurality of downhole, environmental sensors, vibrationally isolated within said bottom hole assembly, the environmental sensors arranged for collecting a set of measurements; and
   a signal processing device arranged for processing the set of measurements into a real time evaluation of a current location of the environmental sensors by comparing data collected while actively drilling said well with data collected when the well drilling operation is not actively drilling the well, the signal processing device including a scheduler apparatus which includes a buffer for recording a stream of sensor data from said at least three sensors, the scheduler apparatus determining whether the instrument package is in said continuous mode of operation or is in said survey mode of operation based a determination that a variance of the sensor data in the buffer is less than a predetermined threshold.

32. The bottom hole assembly of claim 23, further including an environmental module including additional sensors which are not supported by said shock absorbers so that said additional sensors in said environmental module are more sensitive to drill string dynamics than are the at least three sensors which are supported by said shock absorbers.

33. The bottom hole assembly of claim 32 wherein the environmental module identifies quiet periods corresponding to surveys or surveys of opportunity, for controlling whether the instrument package is said survey mode of operation rather than in said continuous mode of operation.

* * * * *